(12) United States Patent
Suzuki et al.

(10) Patent No.: US 8,410,210 B2
(45) Date of Patent: Apr. 2, 2013

(54) FLUORINE-CONTAINING NOVOLAC RESIN, FLUORINE-CONTAINING SURFACTANT, FLUORINE-CONTAINING SURFACTANT COMPOSITION, AND RESIN COMPOSITION

(75) Inventors: Hideya Suzuki, Ichihara (JP); Shin Sasamoto, Ichihara (JP); Kiyofumi Takano, Ichihara (JP)

(73) Assignee: DIC Corporation, Tokyo (JP)

( * ) Notice: Subject to any disclaimer, the term of this patent is extended or adjusted under 35 U.S.C. 154(b) by 558 days.

(21) Appl. No.: 12/524,233

(22) PCT Filed: May 21, 2008

(86) PCT No.: PCT/JP2008/059351
§ 371 (c)(1),
(2), (4) Date: Jul. 23, 2009

(87) PCT Pub. No.: WO2008/146681
PCT Pub. Date: Dec. 4, 2008

(65) Prior Publication Data
US 2010/0113678 A1    May 6, 2010

(30) Foreign Application Priority Data

May 23, 2007 (JP) .................................. 2007-136554
Jul. 9, 2007 (JP) .................................. 2007-179589

(51) Int. Cl.
*C08L 63/00* (2006.01)
(52) U.S. Cl. ............................ 524/541; 523/433; 528/98
(58) Field of Classification Search .................. 524/541; 523/433; 528/98
See application file for complete search history.

(56) References Cited

U.S. PATENT DOCUMENTS

| 4,119,743 | A | * | 10/1978 | Lu .................................. 427/506 |
| 4,876,298 | A | * | 10/1989 | Itoh et al. ....................... 523/433 |
| 4,914,165 | A | * | 4/1990 | Klun et al. ..................... 525/528 |
| 5,235,006 | A | * | 8/1993 | Jones et al. .................... 525/510 |

FOREIGN PATENT DOCUMENTS

| JP | 64-056714 A | | 3/1989 |
| JP | 02-041308 | * | 2/1990 |
| JP | 2-041308 A | | 2/1990 |
| JP | 04-056714 | * | 2/1992 |
| JP | 2000-340031 | * | 12/2000 |
| JP | 2005-290188 | * | 10/2005 |
| JP | 2005-290188 A | | 10/2005 |

OTHER PUBLICATIONS

International Search Report issued in PCT/JP2008/059351 mailed on Jul. 29, 2008.

* cited by examiner

*Primary Examiner* — Peter D. Mulcahy
*Assistant Examiner* — Henry Hu
(74) *Attorney, Agent, or Firm* — Westerman, Hattori, Daniels & Adrian, LLP

(57) ABSTRACT

A fluorine-containing novolac resin represented by the following formula, as well as a fluorine based surfactant and a fluorine based surfactant composition, which include the fluorine-containing novolac resin. In the formula, R represents a fluorinated alkyl-containing substituent, R' represents a hydrogen atom or a methyl group, R" represents a hydrogen atom or a non-fluorinated substituent, —X— represents any one of following four types of linking groups, —X' represents any one of three following types of substituents, n represents 0 or an integer of 1 or more, m represents an integer of 1 or more, and n+m is an integer of 2 or more.

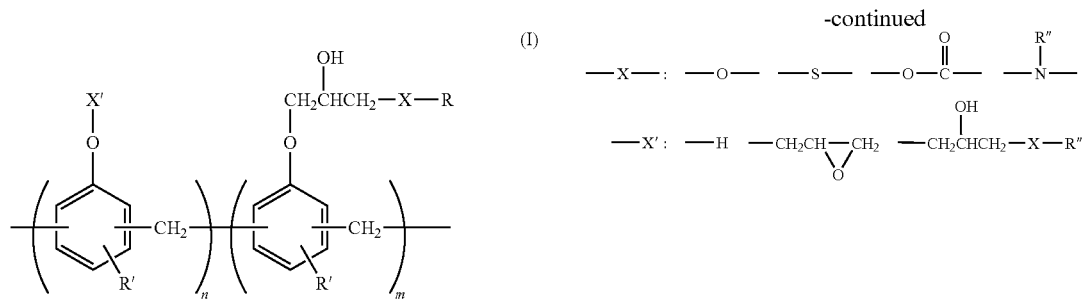
7 Claims, 14 Drawing Sheets

FLUORINE-CONTAINING NOVOLAC RESIN, FLUORINE-CONTAINING SURFACTANT, FLUORINE-CONTAINING SURFACTANT COMPOSITION, AND RESIN COMPOSITION

BACKGROUND OF THE INVENTION

The present invention relates to a new fluorine-containing novolac resin favorably usable as a fluorine based surfactant (hereafter a term "fluorine based surfactant" refers to a fluorine based surfactant in a broad sense and includes a fluorine based surface modifying agent and the like, as well as a fluorine based surfactant in a narrow sense), a fluorine based surfactant including the above-described fluorine-containing novolac resin, a fluorine based surfactant composition including the above-described fluorine-containing novolac resin, and a resin composition including the above-described fluorine-containing novolac resin, an organic solvent, and a curable resin.

Fluorine based surfactants are primarily used as additives and have the functionality, e.g., a leveling property, wettability, penetrability, blocking resistance, water repellency and oil repellency, and soiling resistance (refer to, for example, Patent Document 1). Regarding materials including such fluorine based surfactants, if decomposition reactions occur through heating, moistening, or exposure due to chemical agents, e.g., acids or alkalis, in the following working processes or in the use of products after working, contamination of production lines due to volatilization of the decomposition products, changes in surface properties, deterioration in blocking resistance, deterioration in water repellency and oil repellency, and deterioration in soiling resistance occur.

[Patent Document 1]
Japanese Unexamined Patent Application Publication No. 02-041308

BRIEF SUMMARY OF THE INVENTION

In consideration of the above-described circumstances, it is an object of the present invention to provide a fluorine-containing novolac resin which can deliver the performance favorably even in the case where the fluorine-containing novolac resin is added as a fluorine based surfactant to a material and the resulting material undergoes heating, moistening, or exposure due to chemical agents, e.g., acids or alkalis, in the following working processes or in the use of products after working and which is excellent in heat resistance, chemical agent resistance, and the like, a fluorine based surfactant including the above-described fluorine-containing novolac resin, a fluorine based surfactant composition including the above-described fluorine-containing novolac resin, and a resin composition including the above-described fluorine-containing novolac resin, an organic solvent, and a curable resin.

DETAILED DESCRIPTION OF THE INVENTION

Figure 1:
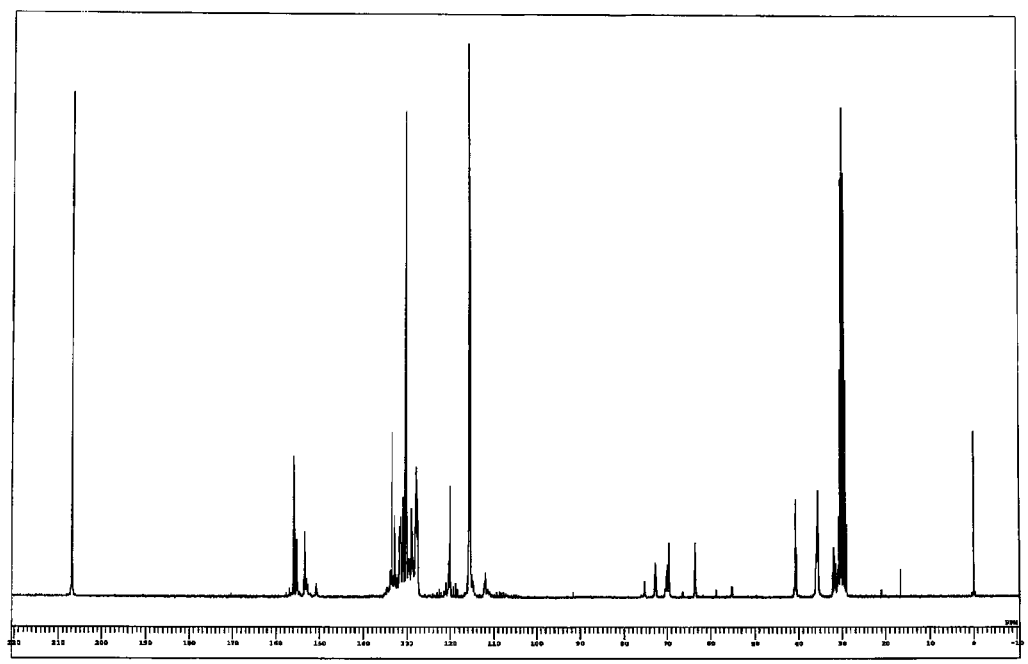
FIG. 1 is a $^{13}$C-NMR spectrum of the compound (A-1) obtained in Example 1.
Figure 2:
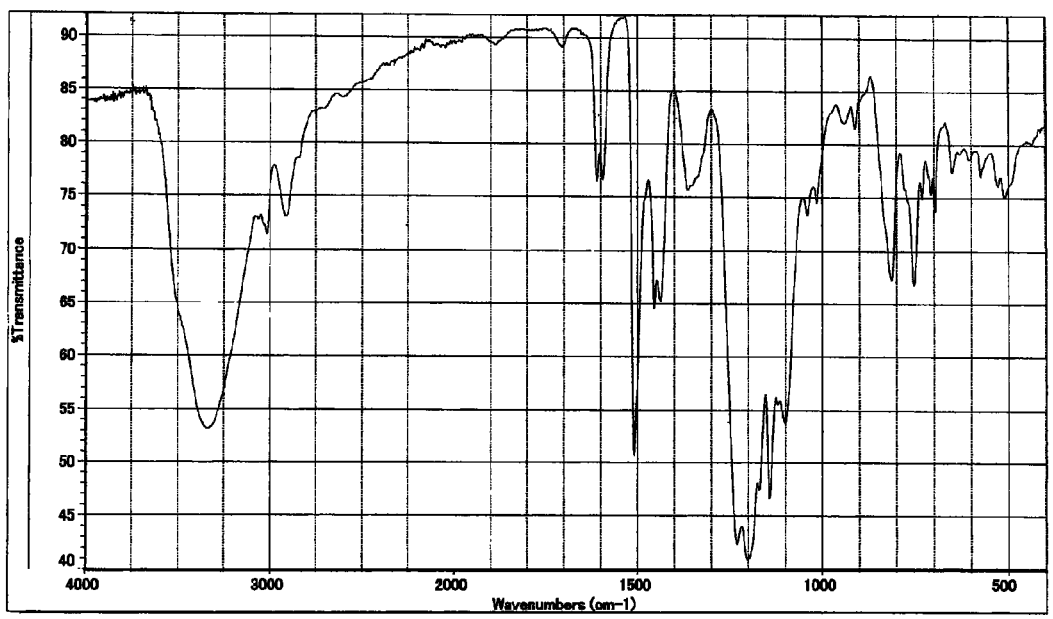
FIG. 2 is an IR spectrum of the compound (A-1) obtained in Example 1.
Figure 3:
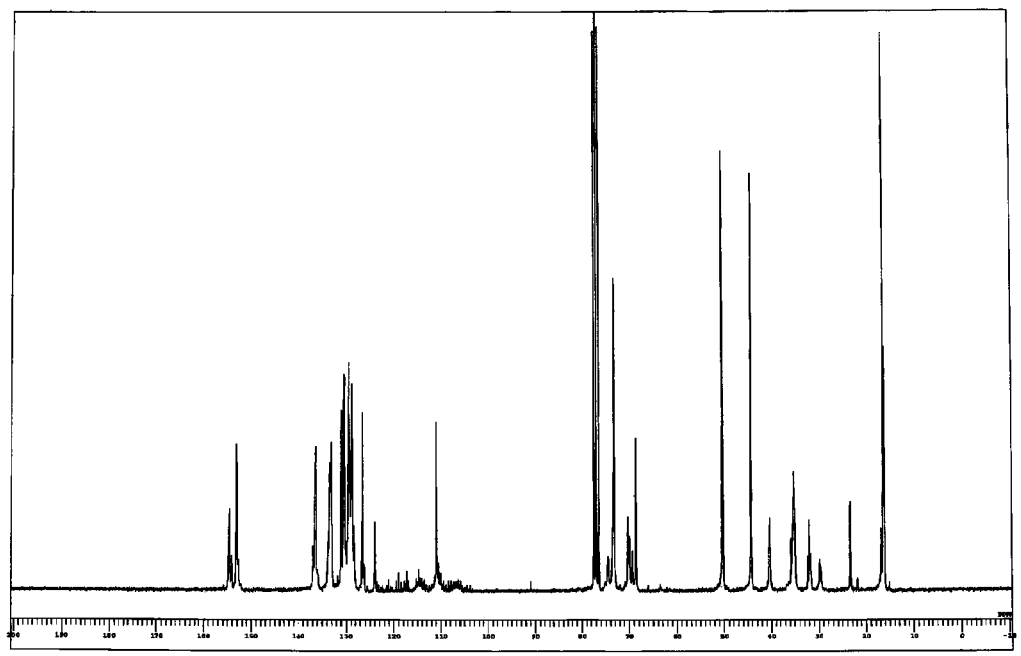
FIG. 3 is a $^{13}$C-NMR spectrum of the compound (A-2) obtained in Example 2.
Figure 4:
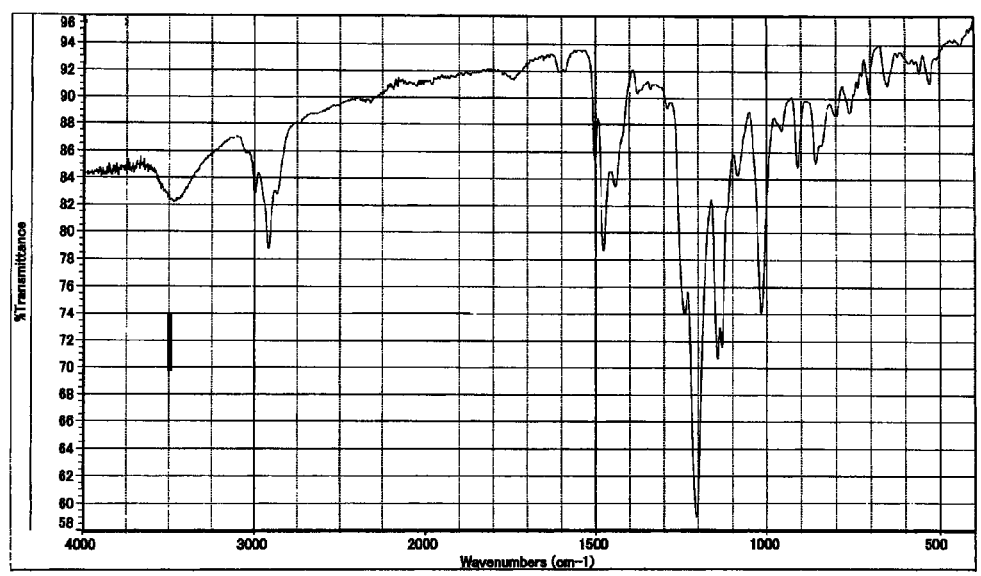
FIG. 4 is an IR spectrum of the compound (A-2) obtained in Example 2.
Figure 5:
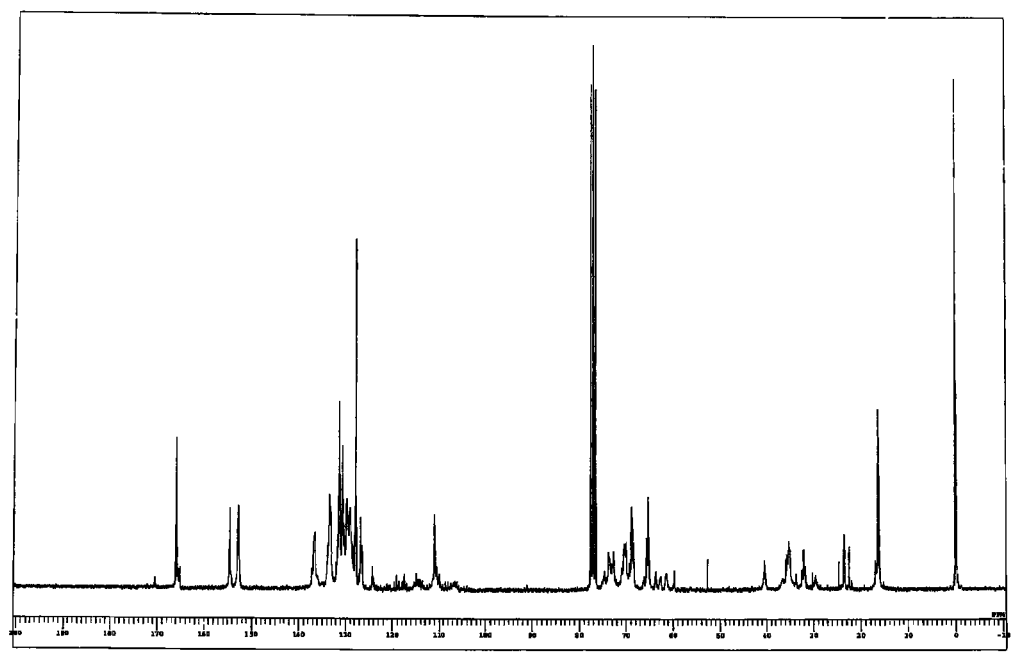
FIG. 5 is a $^{13}$C-NMR spectrum of the compound (A-3) obtained in Example 3.
Figure 6:
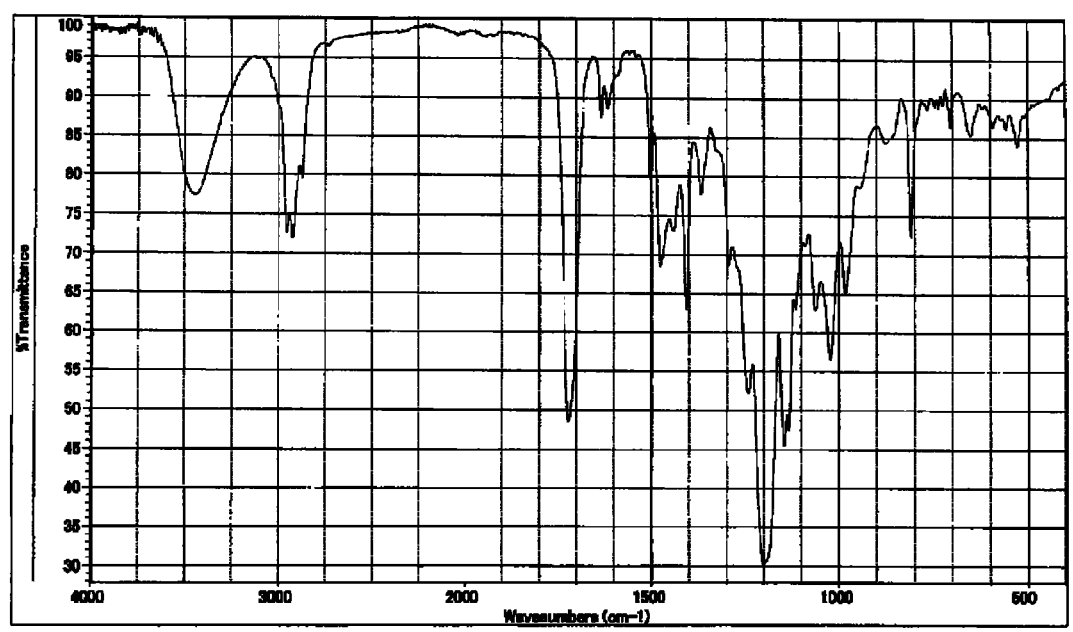
FIG. 6 is an IR spectrum of the compound (A-3) obtained in Example 3.

The inventors of the present invention conducted intensive research in order to solve the above-described problems and found that the above-described problems were able to be solved by using a new fluorine-containing novolac resin as a fluorine based surfactant. Consequently, the present invention has been completed.

That is, the present invention provides a fluorine-containing novolac resin [hereafter referred to as a fluorine-containing novolac resin (I)] represented by General formula (I) described below:

[Chemical formula 1]

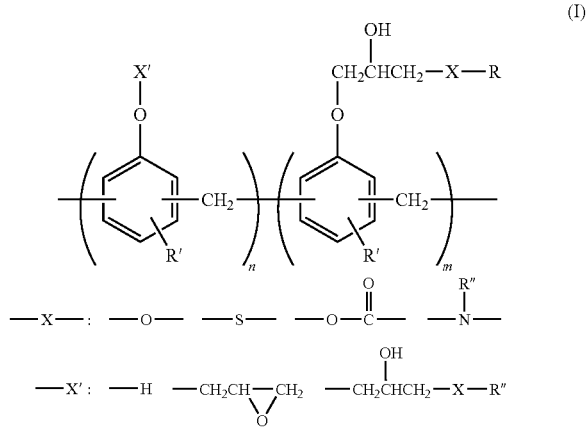

(in the formula, R represents a fluorinated-alkyl-containing substituent, R' represents a hydrogen atom or a methyl group, R" represents a hydrogen atom or a non-fluorinated substituent, —X— represents any one of the above-described four types of linking groups, —X' represents any one of the above-described three types of substituents, n represents 0 or an integer of 1 or more, m represents an integer of 1 or more, and n+m is an integer of 2 or more.).

Furthermore, the present invention provides a fluorine-containing novolac resin [hereafter referred to as a fluorine-containing novolac resin (II)] represented by General formula (I) described above, wherein the fluorine-containing novolac resin includes a (meth)acryloyl group having a structure in which a part of or all hydrogen atoms of the hydroxyl groups contained in the fluorine-containing novolac resin are substituted with a structure represented by General formula (II) described below:

[Chemical formula 2]

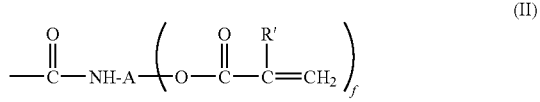

(II)

(in the formula, R' represents a hydrogen atom or a methyl group, A represents a divalent to quadrivalent linking group which is any one of a hydrocarbon group having the carbon number of 2 to 5, an ethylene oxide chain having the number of ethylene units of 2 to 4, and a propylene oxide chain having the number of propylene units of 2 to 4, and f represents an integer of 1 to 3.).

Moreover, the present invention provides a fluorine based surfactant characterized by including the above-described fluorine-containing novolac resin, a fluorine based surfactant composition characterized by including the above-described fluorine-containing novolac resin, and a resin composition characterized by including the above-described fluorine-containing novolac resin, an organic solvent, and a curable resin.

The new fluorine-containing novolac resin according to the present invention has the leveling property, the wettability, the penetrability, the blocking resistance, the water repellency and oil repellency, and the soiling resistance and, in addition, can provide the fluorine based surfactant excellent in heat resistance and chemical agent resistance.

Furthermore, the fluorine-containing novolac resin (I) among the fluorine-containing novolac resins according to the present invention has a novolac skeleton. Therefore, the compatibility with novolac type phenol resins and novolac type epoxy resins is improved and, in addition, excellent compatibility with other phenol resins having aromatic skeletons, epoxy resins, polycarbonate resins, and the like is exerted. Moreover, in the case where a phenolic hydroxyl group, an epoxy group, or a (meth)acryloyl group is included, their reactivity can also be used. For example, in the case where X' is a hydrogen atom, that is, a phenolic hydroxyl group is included, since a skeleton similar to that of the novolac type phenol resin is provided by addition to a novolac type phenol resin based photoresist, the developing property can be improved. Moreover, in the case where X' is a hydrogen atom, that is, a phenolic hydroxyl group is included, bonding into a cured resin is possible in an epoxy-phenol curing system. In the case where an epoxy group is included as X', bonding into a cured resin is possible by addition to various epoxy curing systems. In the case where a (meth)acryloyl group is included as X', bonding into a cured resin is possible by addition to an ultraviolet curing system. In any case, the endurance and maintenance of the water repellency and oil repellency and the soiling resistance after curing can be improved significantly by bonding to a cured resin. Moreover, in the case where a curing-reactive group is included, the usage as a base resin instead of an additive can also exert effects.

Furthermore, the fluorine-containing novolac resin (II) among the fluorine-containing novolac resins according to the present invention has a curing-reactive (meth)acryloyl group. Therefore, bonding into a cured resin can be conducted by addition to a radical polymerization curing system, such as an ultraviolet curing system and heat-polymerization curing, and the endurance and maintenance of the water repellency and oil repellency and the soiling resistance after curing and the chemical agent resistance can be improved significantly by bonding to a cured resin. Moreover, since a curing-reactive group is included, the usage as a base resin instead of an additive can also exert effects.

Best Modes for Carrying Out the Invention

The present invention will be described below in detail.

Fluorine-containing novolac resins according to the present invention include fluorine-containing novolac resins (I) having a structure represented by General formula (I) described above and fluorine-containing novolac resins (II) including a (meth)acryloyl group having a structure in which a part of or all hydrogen atoms of the hydroxyl groups contained in the above-described fluorine-containing novolac resin (I) are substituted with a structure represented by General formula (II) described above.

In General formula (I) described above, R may be various substituents containing fluorinated alkyl groups, and, for example, a functional group, e.g., ether, may be included. Specific examples of R include the following structures. Incidentally, among the above-described fluorine-containing novolac resins (I), fluorinated-alkyl-containing substituents including only saturated bonds, that is, fluorinated-alkyl-containing substituents including no unsaturated bond, are preferable.

[Chemical formula 3]

 (R10)

 (R11)

 (R12)

 (R13)

 (R14)

 (R15)

 (R16)

 (R17)

 (R18)

 (R19)

 (R20)

 (R21)

 (R22)

(R23)

[Chemical formula 4]

 (R24)

 (R25)

(R26)

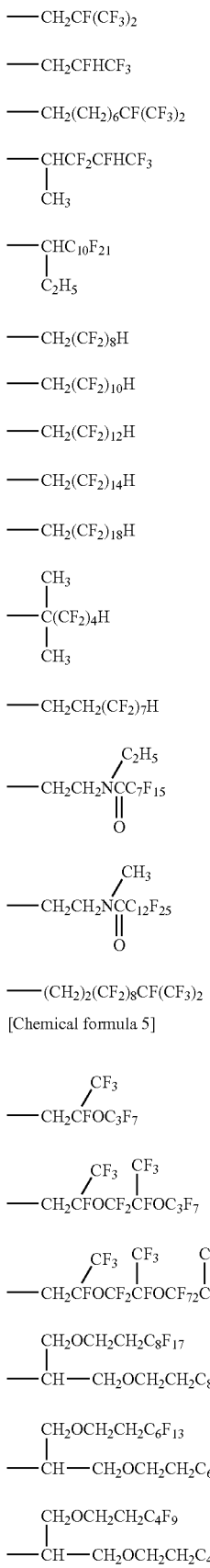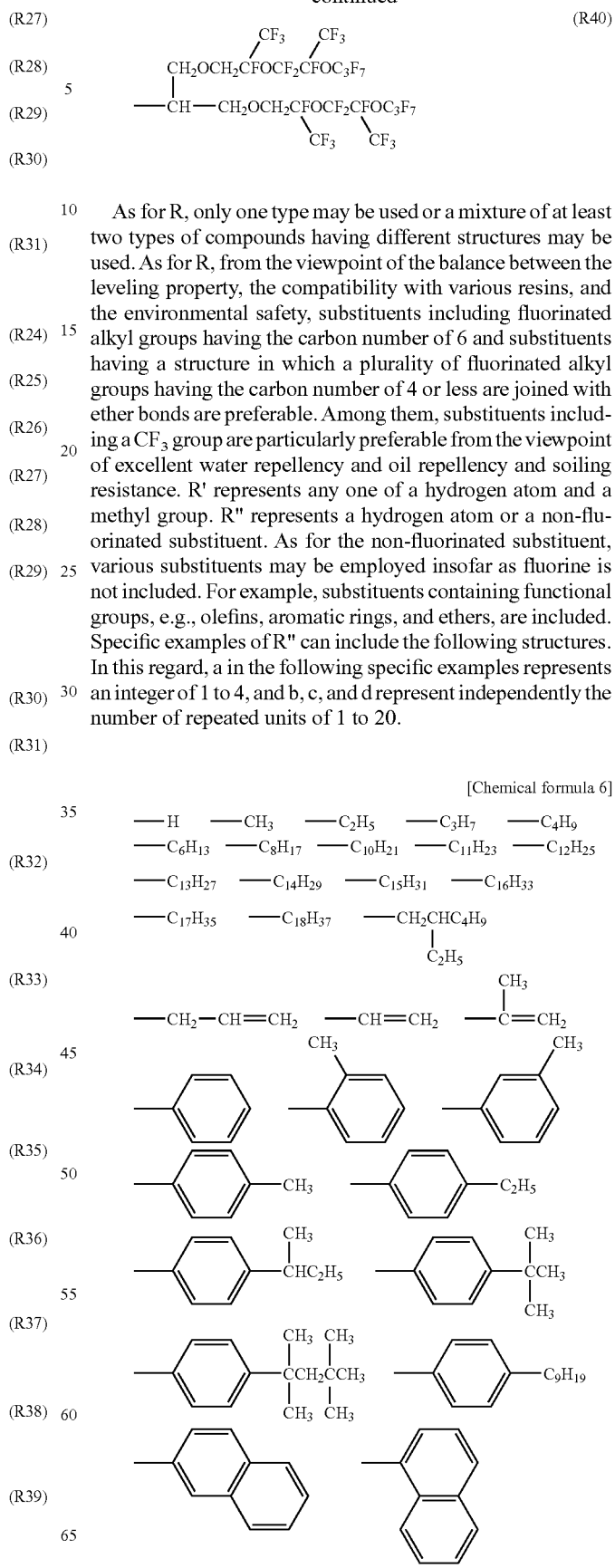

As for R, only one type may be used or a mixture of at least two types of compounds having different structures may be used. As for R, from the viewpoint of the balance between the leveling property, the compatibility with various resins, and the environmental safety, substituents including fluorinated alkyl groups having the carbon number of 6 and substituents having a structure in which a plurality of fluorinated alkyl groups having the carbon number of 4 or less are joined with ether bonds are preferable. Among them, substituents including a $CF_3$ group are particularly preferable from the viewpoint of excellent water repellency and oil repellency and soiling resistance. R' represents any one of a hydrogen atom and a methyl group. R" represents a hydrogen atom or a non-fluorinated substituent. As for the non-fluorinated substituent, various substituents may be employed insofar as fluorine is not included. For example, substituents containing functional groups, e.g., olefins, aromatic rings, and ethers, are included. Specific examples of R" can include the following structures. In this regard, a in the following specific examples represents an integer of 1 to 4, and b, c, and d represent independently the number of repeated units of 1 to 20.

-continued

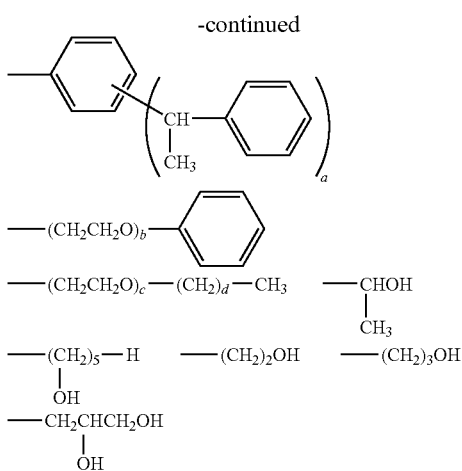

In general formula (I) described above, X represents any one of an oxygen atom, a sulfur atom, an ester group, and a non-fluorinated-substituent-containing imino group. A bonding position of the ester group is the position at which R or R" and a carboxyl group are bonded.

It is preferable that X described above is an oxygen atom or a sulfur atom from the viewpoint of the heat resistance and the chemical agent resistance, and an oxygen atom is particularly preferable. X' described above represents any one of a hydrogen atom, a glycidyl group, and a structures in which a non-fluorinated active hydrogen compound (R"—X—H) is added to a glycidyl group.

Furthermore, among the above-described fluorine-containing novolac resins (I), it is preferable that X' is a hydrogen atom from the viewpoint that excellent compatibility with a phenol resin based composition, e.g., a semiconductor or liquid crystal display photoresist solution, and an excellent developing property are exhibited and the curing-reactivity with the epoxy group is exhibited. Moreover, it is preferable that X' is a glycidyl group from the viewpoint that the curing-reactivity with active hydrogen of a phenol resin and an acid-containing acrylic resin is exhibited. In addition, regarding X', the combination in which R" is —CH=CH$_2$ or —C(CH$_3$)=CH$_2$ and X is an ester group is preferable from the viewpoint that the ultraviolet curability is exhibited, and it is particularly preferable that R" is —CH=CH$_2$. Furthermore, regarding X', the combination in which R" is a hydrogen atom and X is an oxygen atom is preferable from the viewpoint that a plurality of hydroxyl groups having high polarity and exhibiting reactivity with isocyanate are included. Moreover, regarding X', it is preferable that R" includes a repeated unit structure of —CH$_2$CH$_2$O— or —CH(CH$_3$)CH$_2$O— from the viewpoint that the compatibility with a wide range of resins is exhibited.

In addition, among the above-described fluorine-containing novolac resins (II), it is preferable that X' is other than a hydrogen atom from the viewpoint of the heat resistance and the chemical agent resistance, and the combination in which X' is a structure of a glycidyl group with a non-fluorinated active hydrogen compound (R"—X—H) added thereto, R" is a hydrogen atom, and X is an oxygen atom is particularly preferable from the viewpoint that a plurality of hydroxyl groups serving as reaction points with a (meth)acryloyl-containing isocyanate compound are included and, thereby, the curability is improved and the hardness after curing can be made high.

In General formula (I) described above, n represents 0 or an integer of 1 or more, m represents an integer of 1 or more, and n+m is an integer of 2 or more. Since the present invention is a compound having at least one fluorinated alkyl group, m is 1 or more. In this regard, n and m indicate the number of constituents present in the molecule, and the order of bonding of the constituents is not limited.

The ratio of n to m in General formula (I) described above is not specifically limited. The characteristics, e.g., the leveling property, the water repellency and oil repellency, the soiling resistance, the compatibility with a system to which addition is conducted, can be adjusted appropriately by adjusting the ratio. In this regard, the length of a novolac skeleton increases and the molecular weight increases as n+m becomes large and, thereby, the characteristics, e.g., the leveling property and the compatibility with a system to which addition is conducted, can also be adjusted appropriately.

Regarding the novolac type skeleton structure in General formula (I) described above, n+m is a integer of 2 or more and, therefore, in the structure of novolac skeleton, benzene nuclei and methylene groups are bonded alternately. In the novolac skeleton, the positions bonded to the methylene group in the benzene nucleus are mainly two ortho positions and one para position relative to the position bonded to an oxygen atom in the benzene nucleus. Therefore, in the case where R' is not a methyl group, three methylene groups can be bonded to one benzene nucleus. Even in the case where R' is a methyl group, regarding the structure in which the methyl group is bonded to the meta position of the above-described benzene nucleus, three methylene groups can be bonded to one benzene nucleus. Regarding the structure in which the methyl group is bonded to the ortho position or para position of the above-described benzene nucleus, two methylene groups can be bonded to one benzene nucleus. In either case of R', at least one methylene group is bonded to the benzene nucleus in the structure. The benzene nucleus bonded to one methylene group serves as a terminal nucleus of the novolac skeleton.

In General formula (II) described above, R' represents a hydrogen atom or a methyl group.

It is preferable that R' is a hydrogen atom from the viewpoint of excellent ultraviolet curability.

In General formula (II) described above, A represents a divalent to quadrivalent linking group which is any one of a hydrocarbon group having the carbon number of 2 to 5, an ethylene oxide chain having the number of ethylene units of 2 to 4, and a propylene oxide chain having the number of propylene units of 2 to 4. Since A is divalent to quadrivalent, f represents an integer of 1 to 3.

It is preferable that A is 1,2-ethylene group from the viewpoint of the balance between the hardness after curing and the soiling resistance.

Specific examples of A which is a hydrocarbon group having the carbon number of 2 to 5 can include the following structures.

[Chemical formula 7]

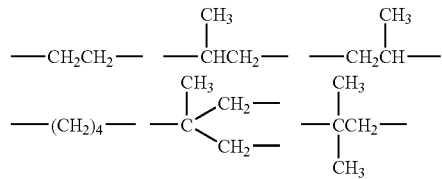

-continued

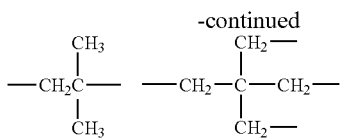

Specific examples of A which is an ethylene oxide chain having the number of ethylene units of 2 to 4 can include the following structures.

[Chemical formula 8]

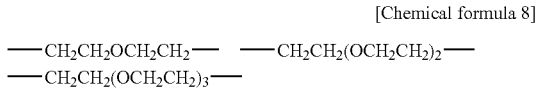

Specific examples of A which is a propylene oxide chain having the number of propylene units of 2 to 4 can include the following structures.

[Chemical formula 9]

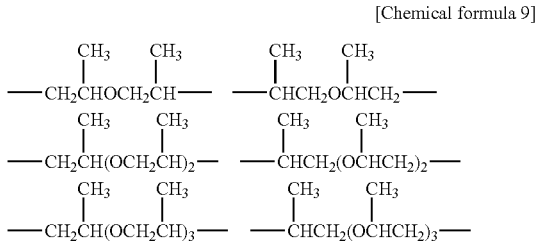

A method for synthesizing the fluorine-containing novolac resin according to the present invention is not limited. However, preferable methods are exemplified.

Initially, phenol or cresol and formaldehyde are reacted under an acidic condition and, thereby, a phenol novolac resin or a cresol novolac resin is obtained easily. Hereafter both of them are simply referred to as novolac type phenol resin. The structure of the novolac type phenol resin is described below (in the structural formula described below, R' represents a hydrogen atom or a methyl group, and e represents 0 or an integer of 1 or more.).

[Chemical formula 10]

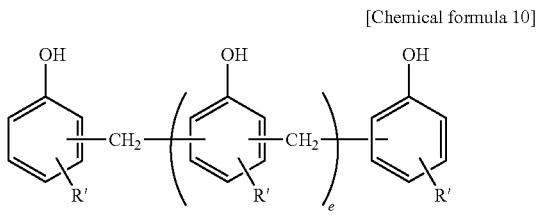

Regarding a method for synthesizing the fluorine-containing novolac resin in which X' is a hydrogen atom, synthesis can be conducted by subjecting the epoxy group of the fluorinated-alkyl-containing glycidyl compound to an addition reaction to a part of the phenolic hydroxyl groups of the resulting novolac type phenol resin.

Furthermore, the fluorine-containing novolac resin in which n=0 can be synthesized by subjecting the epoxy group of the fluorinated-alkyl-containing glycidyl compound to an addition reaction to all phenolic hydroxyl groups of the novolac type phenol resin. Usually, this reaction proceeds through heating in the presence of a catalyst by using a solvent. Examples of catalysts include alkali metal salts or hydroxides, ammonium salts or hydroxides thereof, amines, phosphonium salts or hydroxides thereof, and phosphines. The fluorinated-alkyl-containing glycidyl compound is not specifically limited. Specific examples include the following compounds.

[Chemical formula 11]

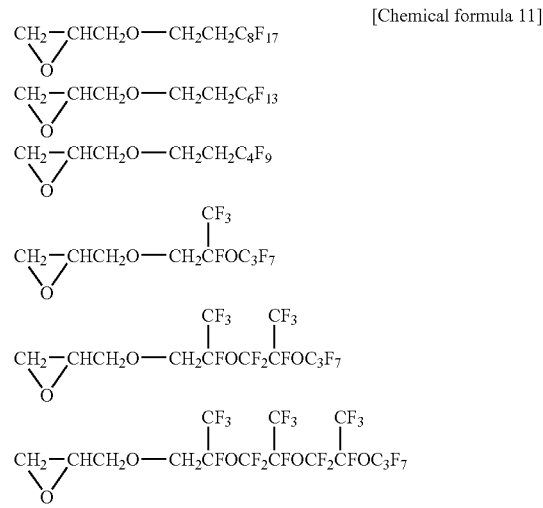

Regarding the method for the synthesizing fluorine-containing novolac resin in which X' in General formula (I) is a glycidyl group, an excess amount of epichlorohydrin is added to the phenolic hydroxyl group of the novolac type phenol resin, a ring closure reaction is effected through dehydrochlorination so as to obtain a novolac type epoxy resin, and a fluorinated-alkyl-containing active hydrogen compound is subjected to an addition reaction to a part of epoxy groups of the resulting epoxy resin, so that a fluorine-containing novolac resin in which X' is a glycidyl group can be synthesized. The structure of the novolac type epoxy resin is described below (in the structural formula described below, R' represents a hydrogen atom or a methyl group, and e represents 0 or an integer of 1 or more.).

[Chemical formula 12]

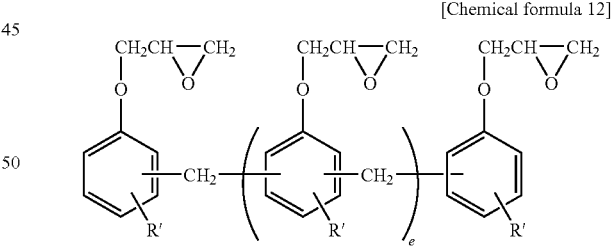

Besides this, the fluorine-containing novolac resin in which X' is a glycidyl group can also be synthesized by subjecting the glycidyl group of fluorinated-alkyl-containing glycidyl compound to an addition reaction to a part of the phenolic hydroxyl groups of the novolac type phenol resin, adding an excess amount of epichlorohydrin to the remaining phenolic hydroxyl groups, and effecting a ring closure reaction through dehydrochlorination.

Furthermore, the fluorine-containing novolac resin in which n=0 in General formula (I) can be synthesized by subjecting the fluorinated-alkyl-containing active hydrogen compound to an addition reaction to all epoxy groups of the novolac type epoxy resin.

The fluorinated-alkyl-containing active hydrogen compound is any one of fluorine-containing alcohols, fluorine-containing phenols, fluorine-containing thiols, fluorine-containing carboxylic acids, and fluorine-containing amines, and is not specifically limited insofar as the compound is included among them. Specific examples include compounds described bellow.

The non-fluorinated glycidyl compound is not limited. Specific examples thereof include the following compounds.

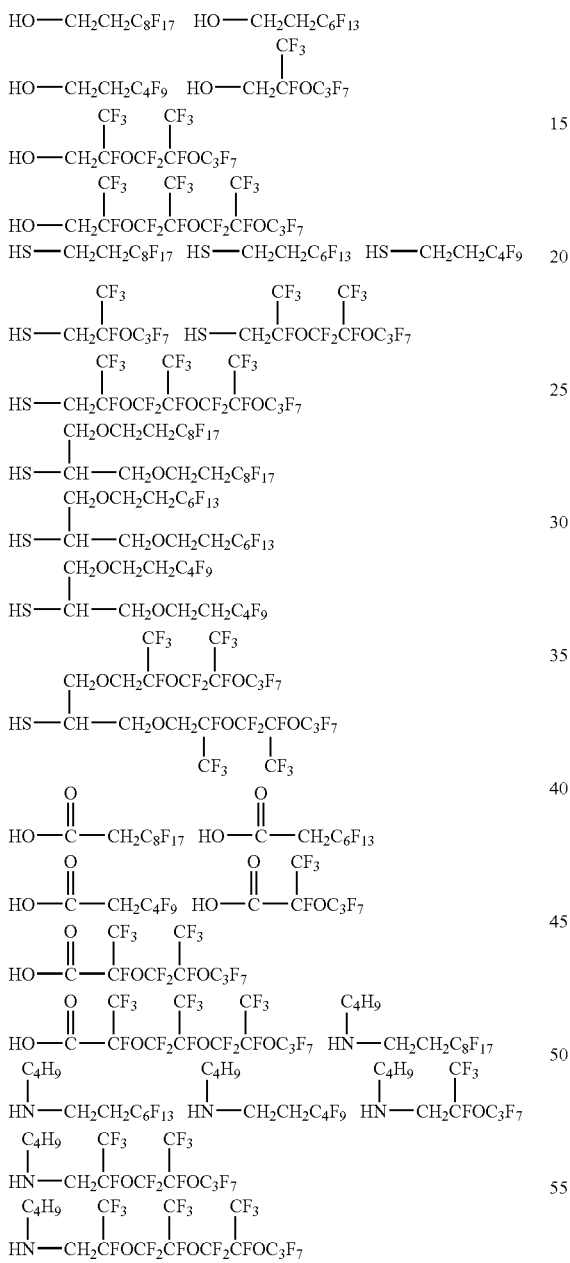

[Chemical formula 13]

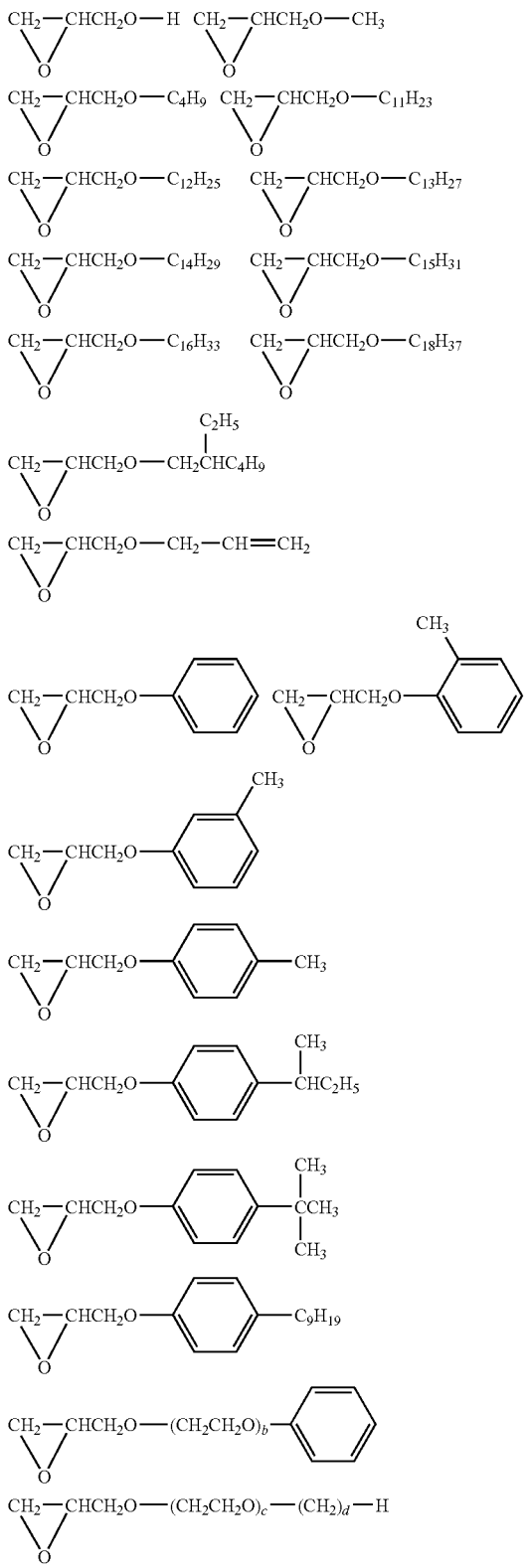

[Chemical formula 14]

Regarding the method for synthesizing the fluorine-containing novolac resin in which X' is a structure of a glycidyl group with a non-fluorinated active hydrogen compound added thereto, epoxy groups of both the fluorinated-alkyl-containing glycidyl compound and the non-fluorinated glycidyl compound are subjected to an addition reaction to all phenolic hydroxyl groups of the novolac type phenol resin and, thereby, the resin is obtained.

[Chemical formula 15]

Moreover, a fluorine-containing novolac resin in which X' has both the structure of a glycidyl group with a non-fluorinated active hydrogen compound added thereto and the structure of being a hydrogen atom can be obtained by leaving a part of the phenolic hydroxyl groups unreacted.

Regarding the method for synthesizing the fluorine-containing novolac resin in which X' is a structure of a glycidyl group with a non-fluorinated active hydrogen compound added thereto, the resin can also be obtained by subjecting the active hydrogen of both the fluorinated-alkyl-containing active hydrogen compound and the non-fluorinated active hydrogen compound to an addition reaction to all epoxy groups of the novolac type phenol resin.

The non-fluorinated active hydrogen compound is any one of alcohols, phenols, thiols, carboxylic acids, and amines, and is not specifically limited insofar as the compound is included among them. Specific examples include compounds described bellow.

[Chemical formula 16]

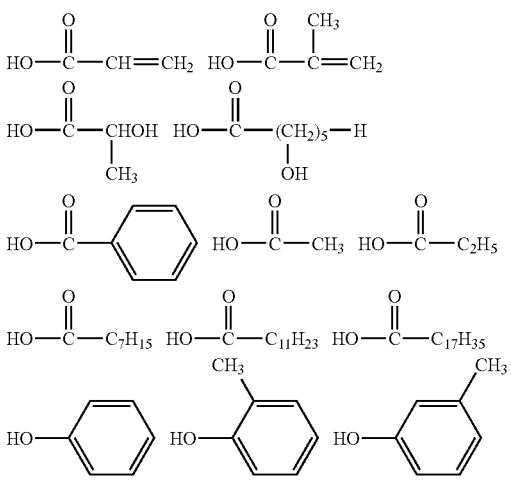

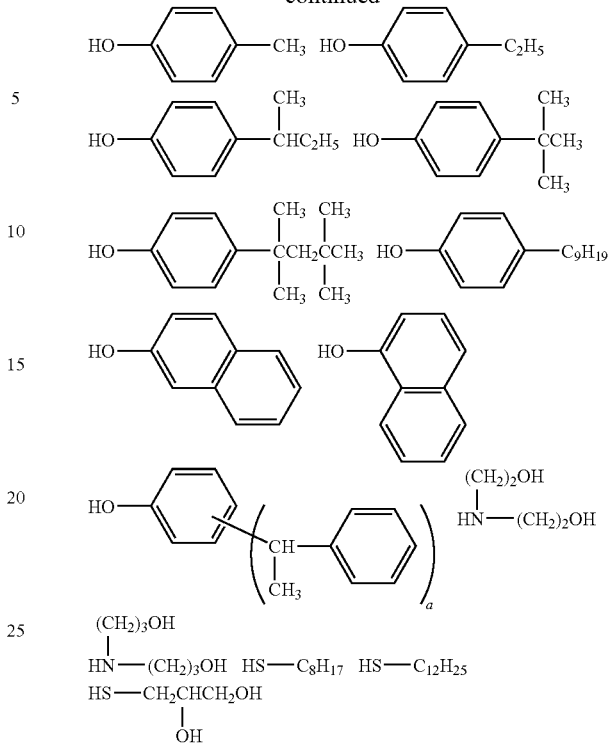

In addition, a fluorine-containing novolac resin in which X' has both the structure of a glycidyl group with a non-fluorinated active hydrogen compound added thereto and the structure of being a glycidyl group can be obtained by leaving a part of the epoxy groups unreacted.

In all synthesis methods described above, solvents may be used appropriately. The solvent is not specifically limited. Examples thereof include ketones, esters, amides, sulfoxides, ethers, alcohols, and hydrocarbons. Specific examples include acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethylsulfoxide, diethyl ether, diisopropyl ether, tetrahydrofuran, dioxane, methanol, ethanol, isopropanol, butanol, propylene glycol monomethyl ether, butyl cellosolve, toluene, and xylene. They are selected appropriately in consideration of the boiling point and the reactivity.

The isocyanate group of the (meth)acryloyl-containing isocyanate compound is subjected to an addition reaction to a part of or all hydroxyl groups contained in the fluorine-containing novolac resin (I) obtained as described above and, thereby, a new fluorine-containing novolac resin (II) including a (meth)acryloyl group according to the present invention can be synthesized.

The (meth)acryloyl-containing isocyanate compound is a compound having a structure in which one isocyanate group and one to three (meth)acrylate groups are joined by a divalent to quadrivalent linking group. The linking group is any one of a hydrocarbon group having the carbon number of 2 to 5, an ethylene oxide chain having the number of ethylene units of 2 to 4, and a propylene oxide chain having the number of propylene units of 2 to 4.

The (meth)acryloyl-containing isocyanate compound is not limited insofar as the compound is within the above-described range. Specific examples include compounds described bellow.

[Chemical formula 17]

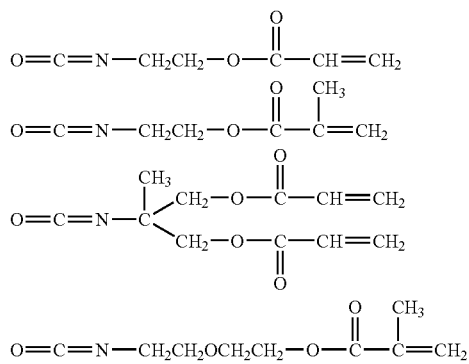

Regarding the condition of the reaction between the fluorine-containing novolac resin (I) and the (meth)acryloyl-containing isocyanate compound, the reaction is conducted while (meth)acryloyl-containing isocyanate compound is dropped in the presence of hydroquinone monomethyl ether or the like serving as a polymerization inhibitor without catalyst or by using dibutyltin dilaurate or the like serving as a catalyst.

In the reaction between the fluorine-containing novolac resin (I) and the (meth)acryloyl-containing isocyanate compound, a solvent may be used appropriately. As for the solvent, a solvent containing no hydroxyl group, which has the reactivity with the isocyanate group, is preferable. Examples thereof include ketones, esters, ethers, and hydrocarbons. Specific examples include acetone, methyl ethyl ketone, methyl isobutyl ketone, cyclohexanone, ethyl acetate, butyl acetate, propylene glycol monomethyl ether acetate, diethyl ether, diisopropyl ether, tetrahydrofuran, dioxane, toluene, and xylene. They are selected appropriately in consideration of the boiling point and the reactivity.

Regarding the amount of introduction of acryloyl groups, in the case where an increase in the amount of introduction is intended, a fluorine-containing novolac resin having a large amount of hydroxyl groups may be used or the amount of hydroxyl groups to be reacted with a (meth)acryloyl-containing isocyanate compound may be increased, and in the case where a decrease in the amount of introduction is intended, a fluorine-containing novolac resin (I) having a small amount of hydroxyl groups may be used or the amount of hydroxyl groups to be reacted with a (meth)acryloyl-containing isocyanate compound may be decreased, so that the control can be conducted appropriately.

In any case of the above-described synthesis methods, at least two types of reaction components may be used in combination in one step or in multiple steps, and the molar ratios of the reaction components may be selected appropriately in accordance with, for example, the use of product.

For example, in the case where the above-described fluorine-containing novolac resin (I) is added to a formulation containing a phenol resin or an epoxy resin or in the case where the above-described fluorine-containing novolac resin (II) is added to an ultraviolet-curable resin formulation, if the compatibility is insufficient, R may be changed to a structure having better compatibility or the amount of introduction of the component containing R may be reduced. Conversely, in the case where the compatibility is sufficient, but the water repellency and oil repellency and the soiling resistance are insufficient, the structure of R may be changed to become suitable for improving the water repellency and oil repellency and the soiling resistance or the amount of introduction of the component containing R may be increased. Furthermore, in order to improve the compatibility, measures can also be taken by changing the structure to be introduced into the portion of X' and the amount of introduction.

Besides, in the synthesis of the above-described fluorine-containing novolac resin (I), a phenolic hydroxyl group is included by specifying the portion of X' to be a hydrogen atom, an epoxy group is included by specifying the portion of X' to be a glycidyl group, and furthermore, a (meth)acryloyl group can be introduced into the portion of X'. In all cases, it becomes possible to use as a reactive additive taking the advantage of the reactivity thereof. Moreover, in the synthesis of the above-described fluorine-containing novolac resin (II), in order to adjust the curability and the hardness after curing of the (meth)acryloyl group, measures can also be taken by adjusting the type and the amount of introduction of the (meth)acryloyl group or changing the structure to be introduced into the portion of X' and the amount of introduction. For example, in the case where it is desired to increase the curability and the hardness, measures can be taken by selecting an acryloyl group or increasing the amount of introduction of (meth)acryloyl groups.

Regarding the fluorine-containing novolac resin (I) according to the present invention, specific examples of structures are not limited. Specific examples include structures described bellow.

[Chemical formula 18]

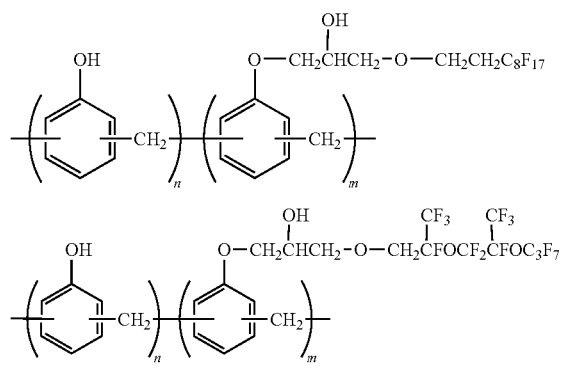
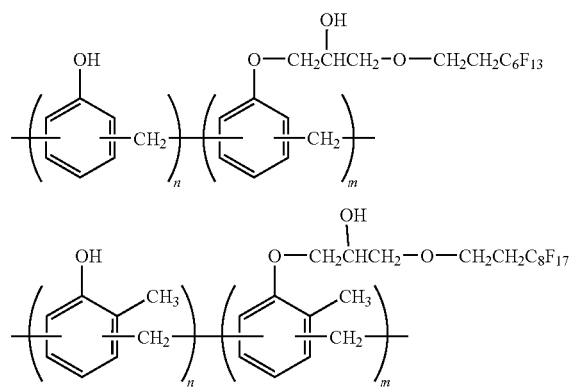

-continued
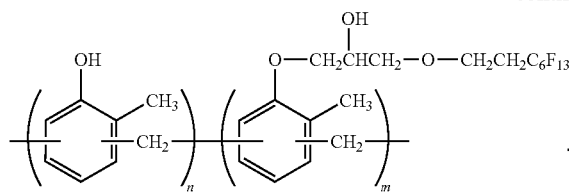
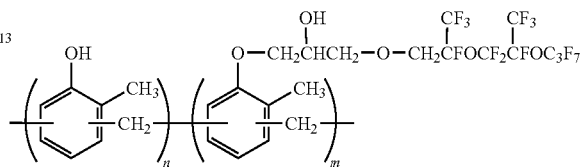
[Chemical formula 19]
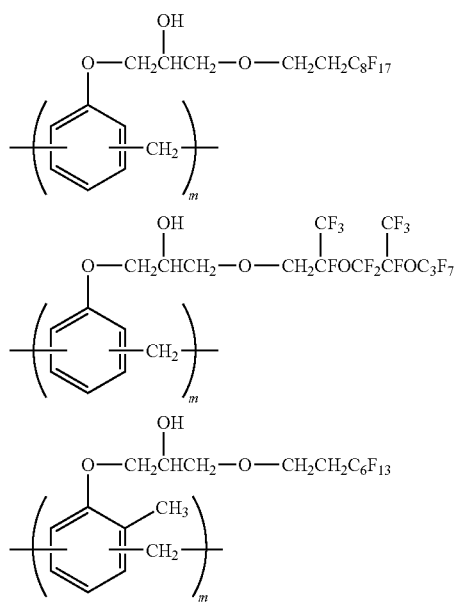
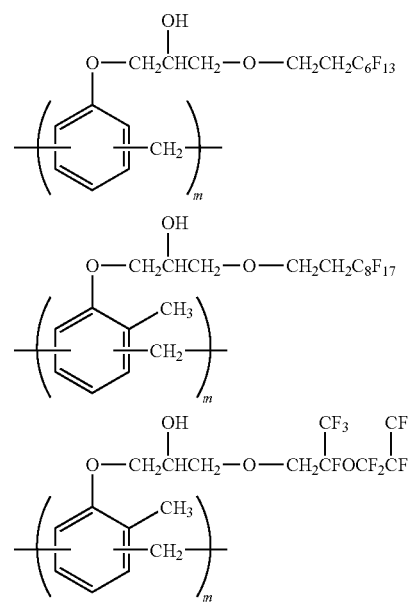
[Chemical formula 20]
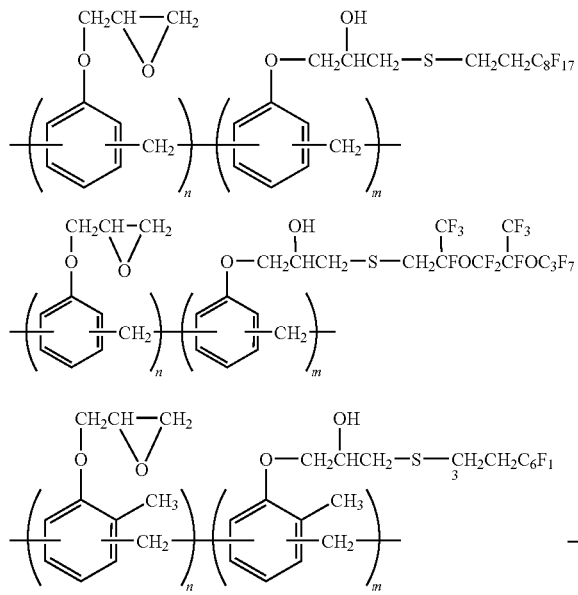
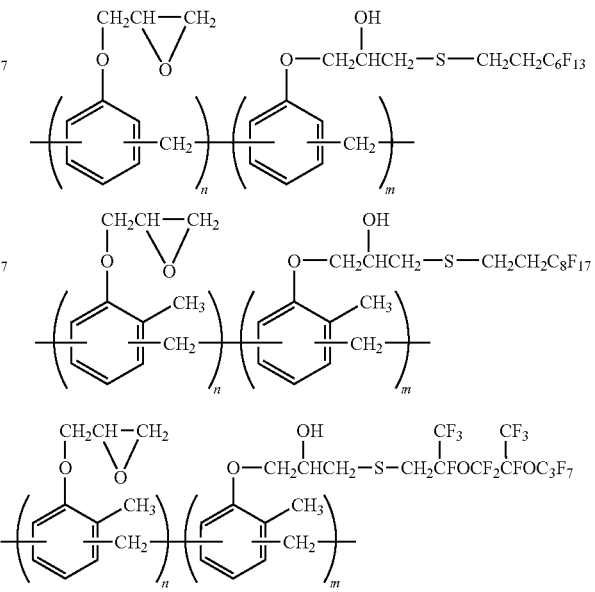
[Chemical formula 21]
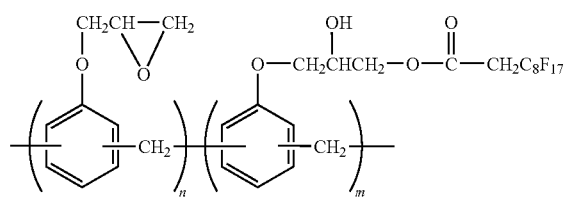
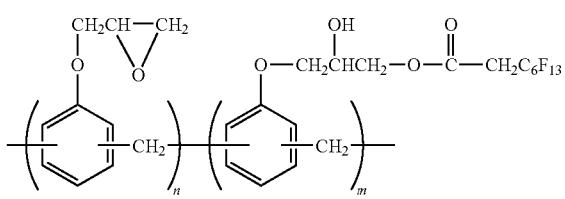

-continued
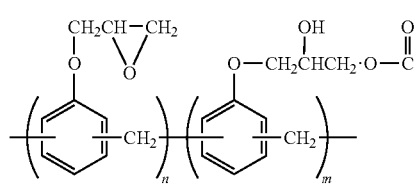
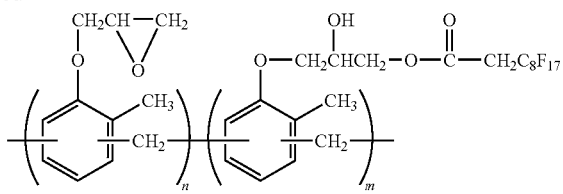
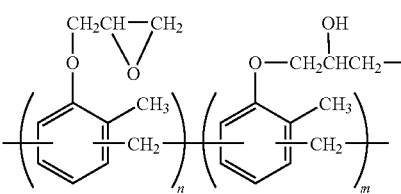
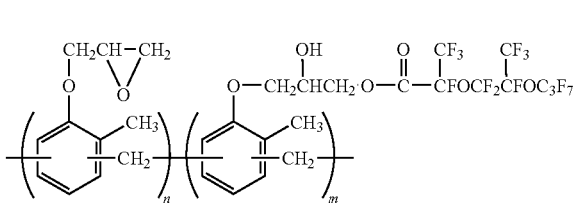
[Chemical formula 22]
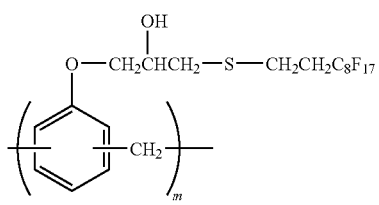
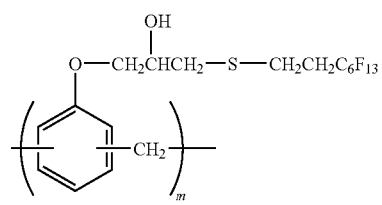
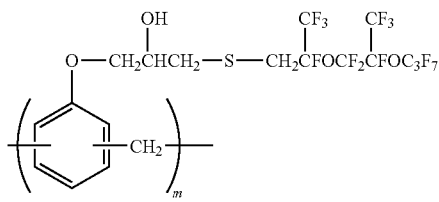
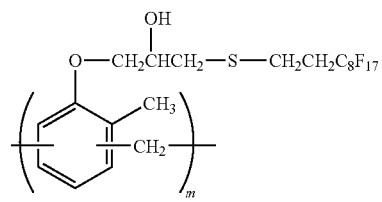
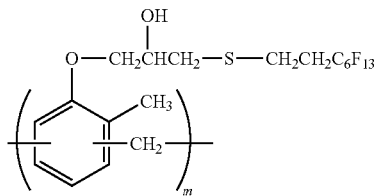
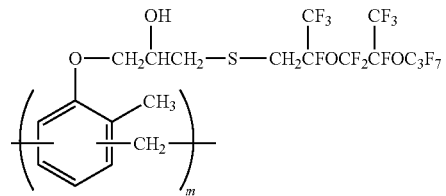
[Chemical formula 23]
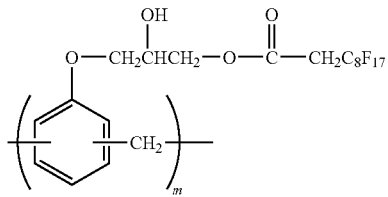
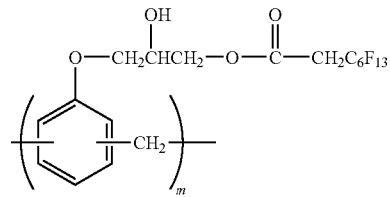
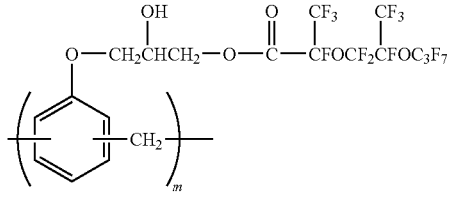
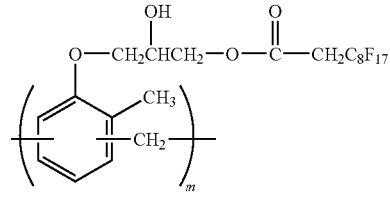
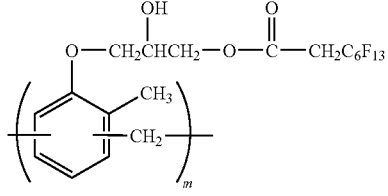
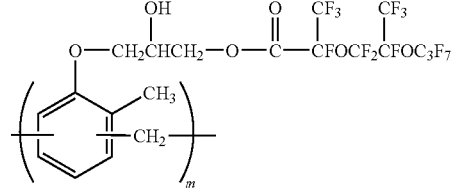

-continued
[Chemical formula 24]
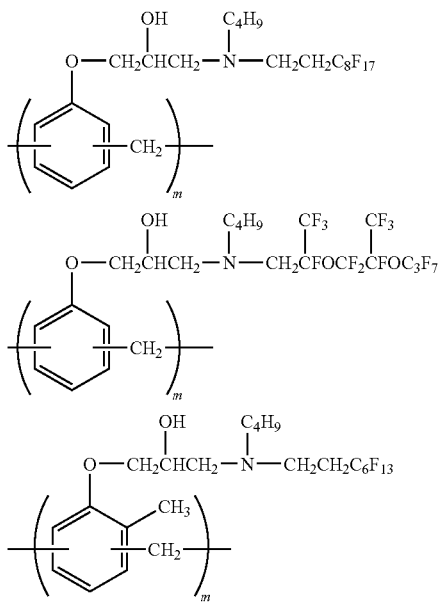
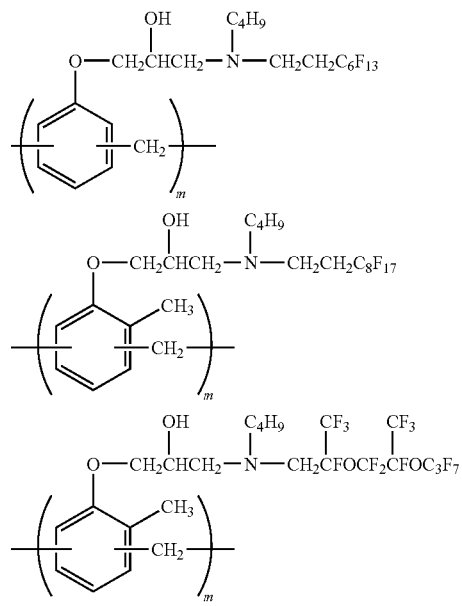
[Chemical formula 25]
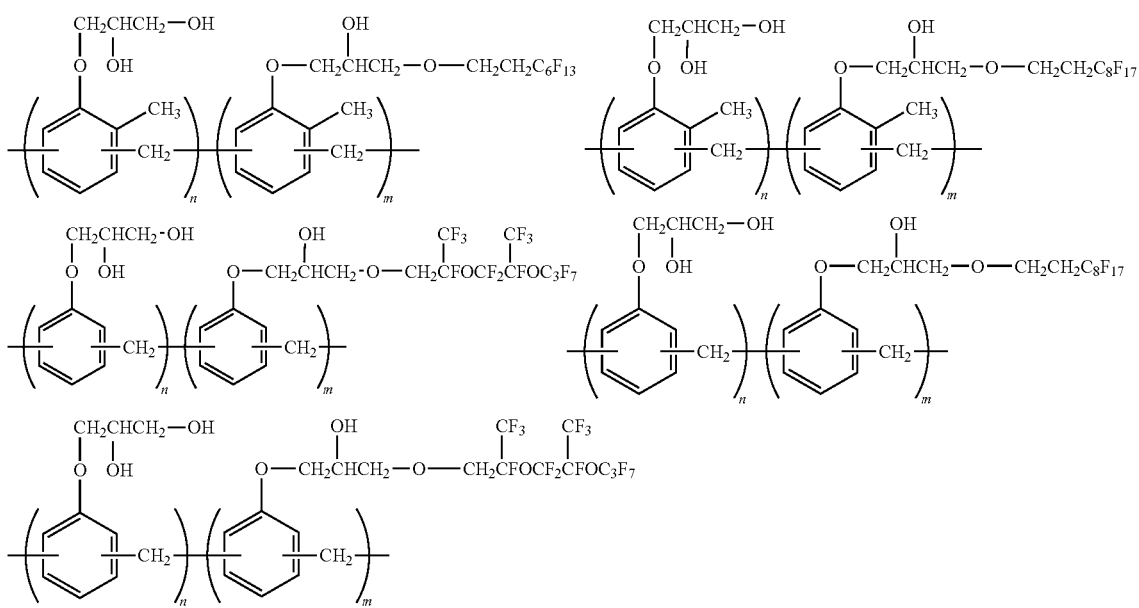
[Chemical formula 26]
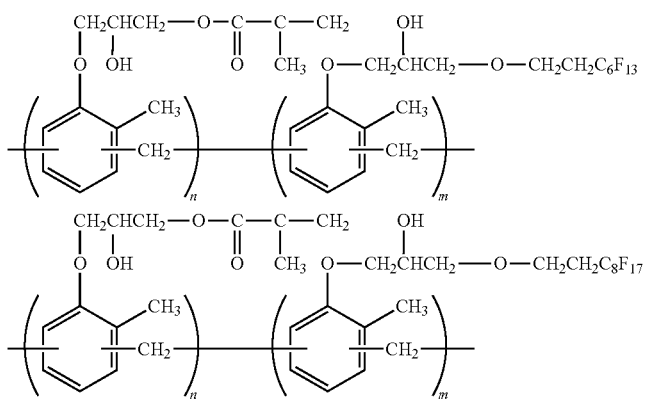

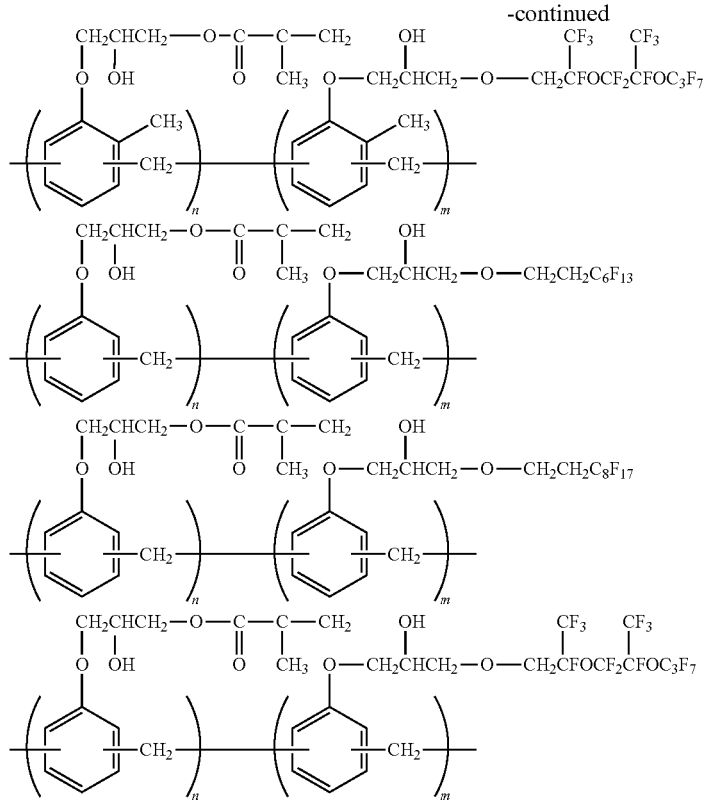
[Chemical formula 27]
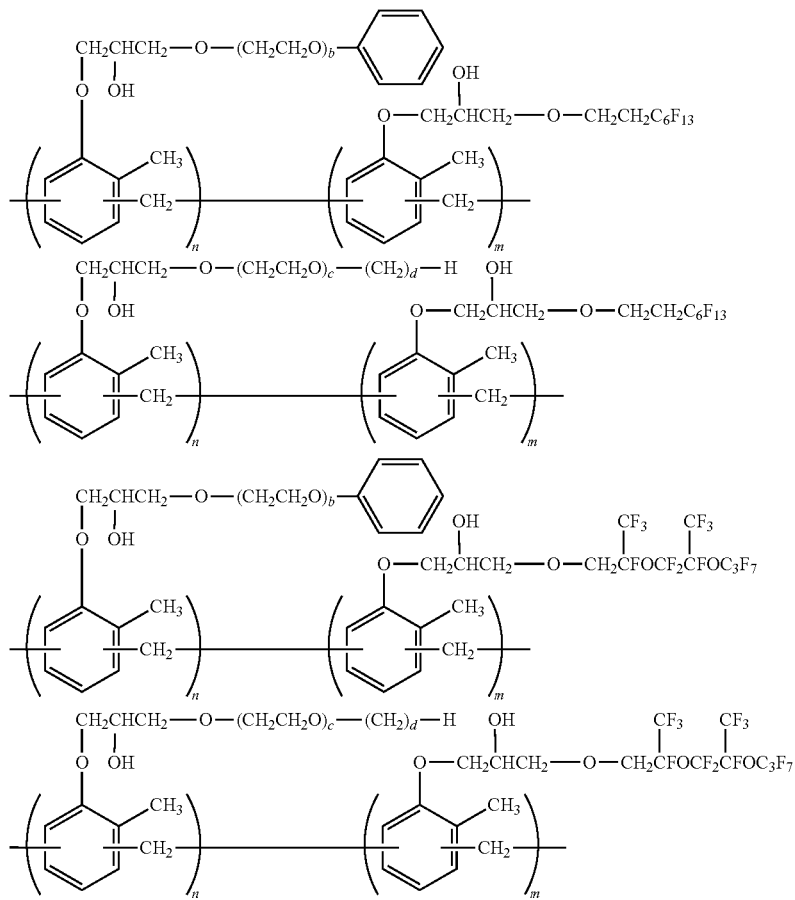

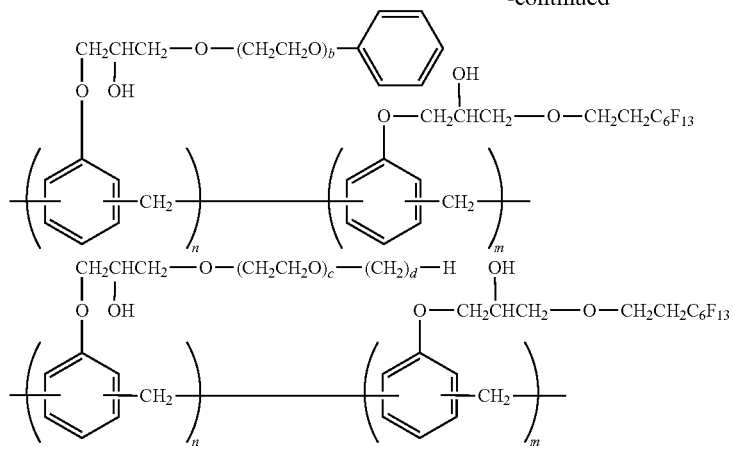
[Chemical formula 28]
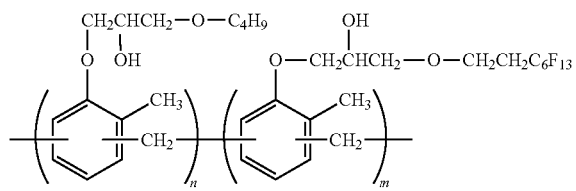
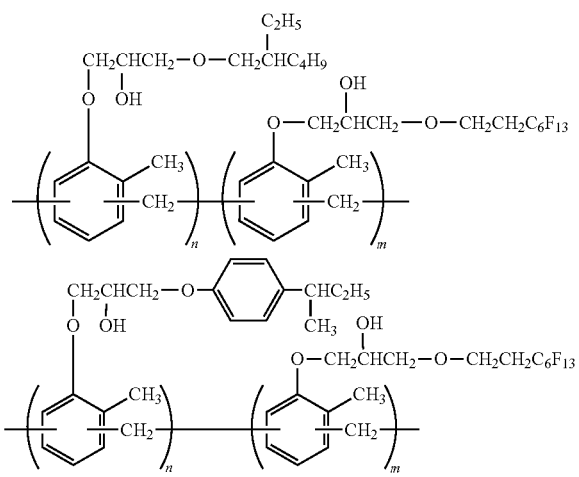
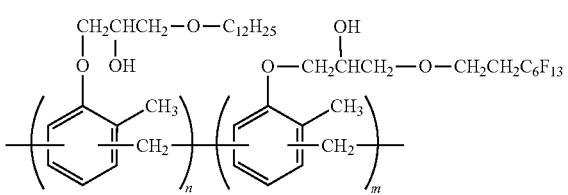
[Chemical formula 29]
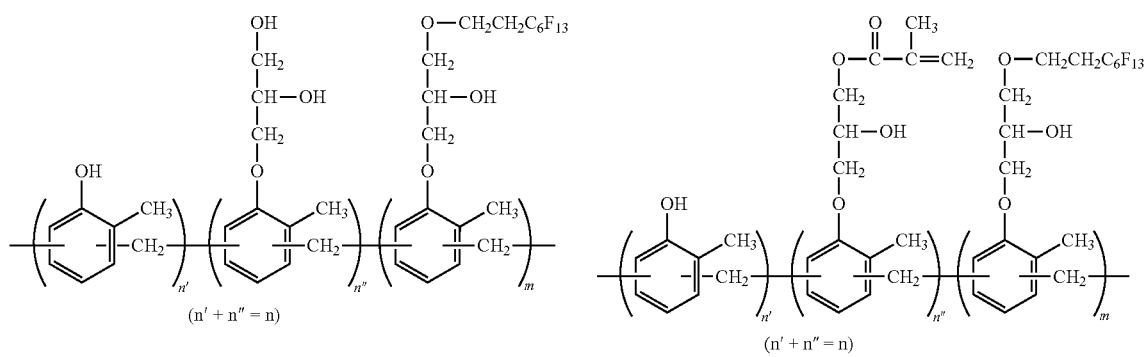
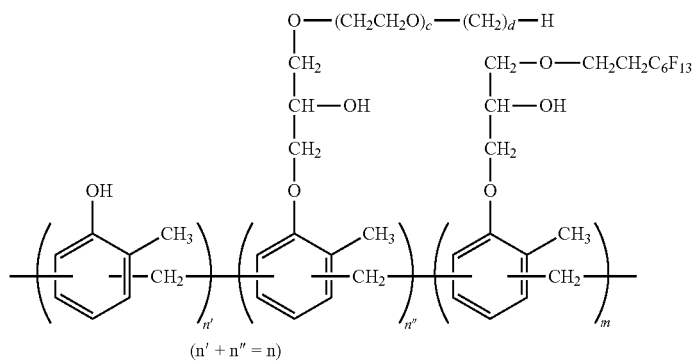

[Chemical formula 30]
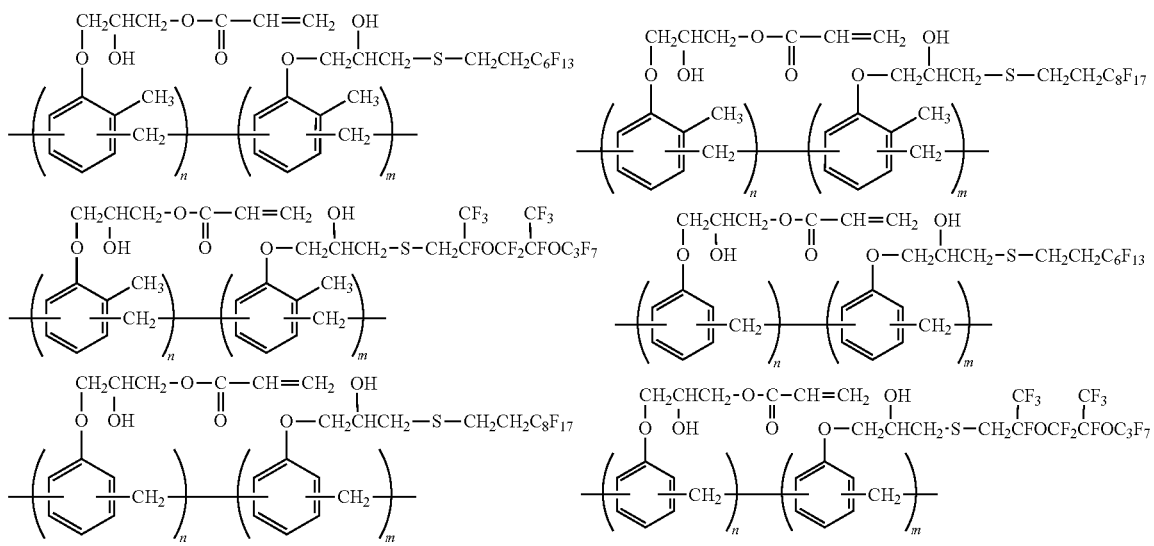
[Chemical formula 31]
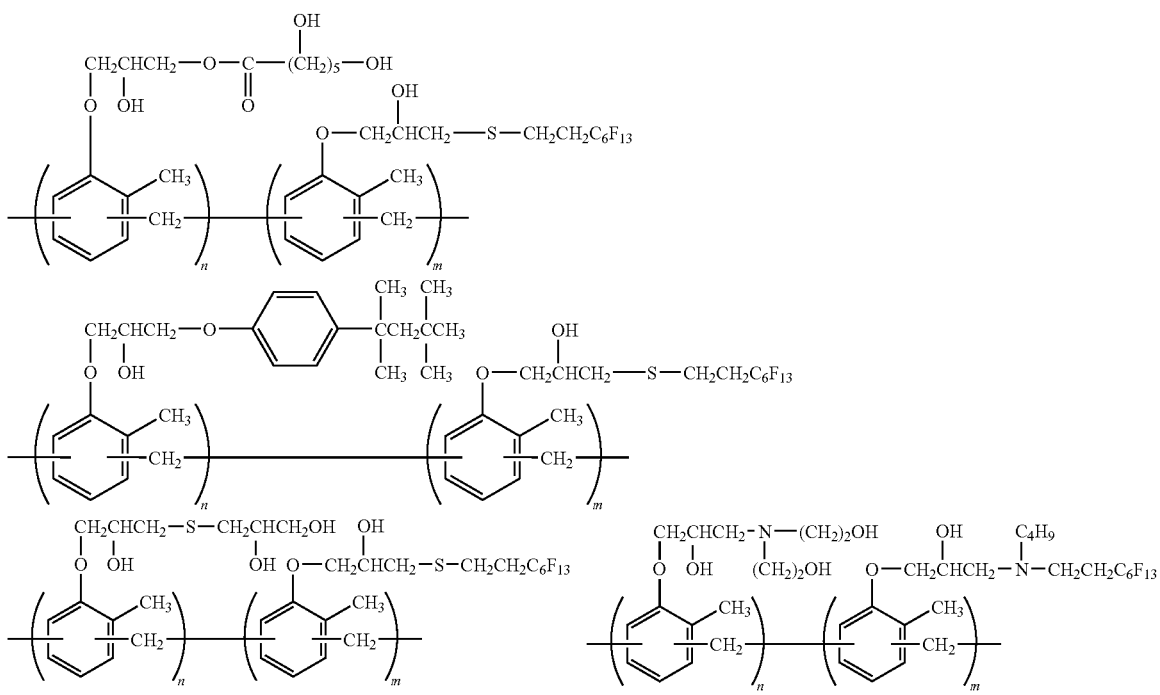
[Chemical formula 32]
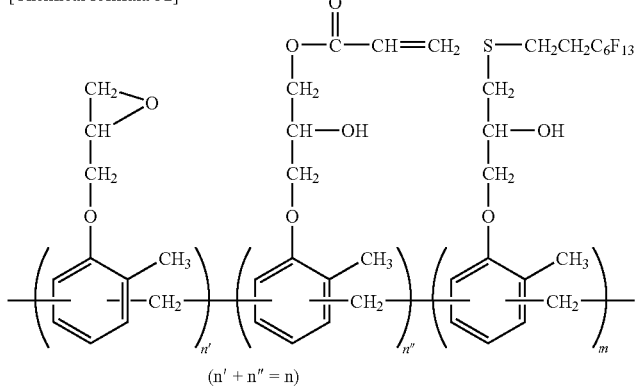
(n' + n" = n)

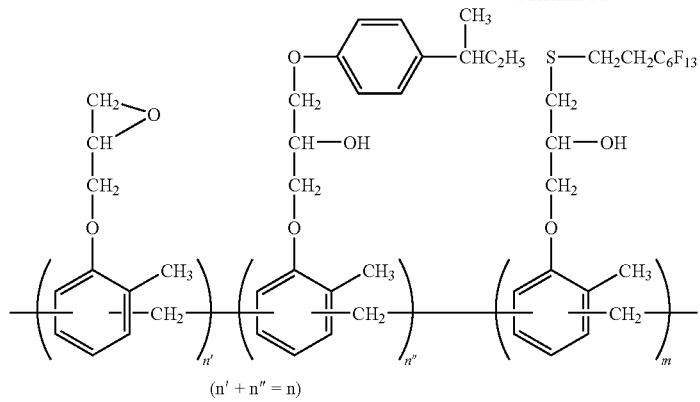
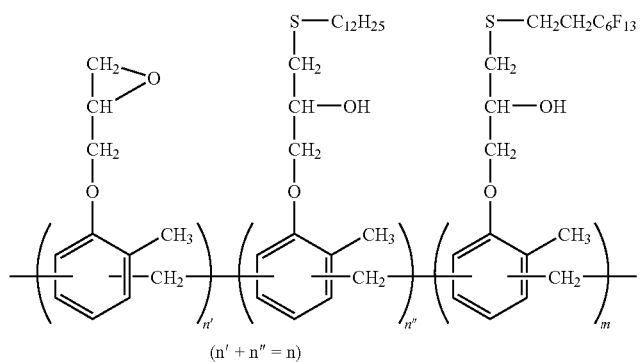
Regarding the fluorine-containing novolac resin (II) according to the present invention, specific examples of structures are not limited. Specific examples include structures described bellow.
[Chemical formula 33]
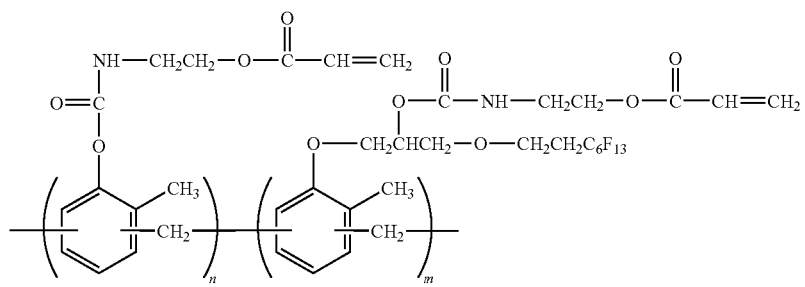
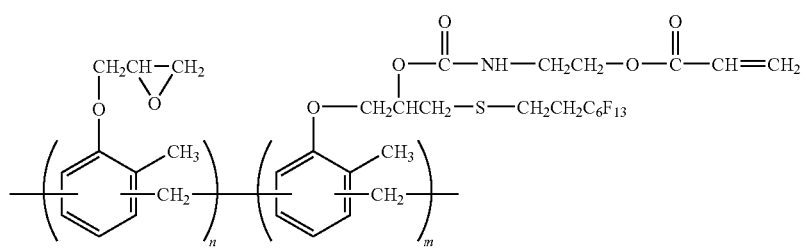

-continued
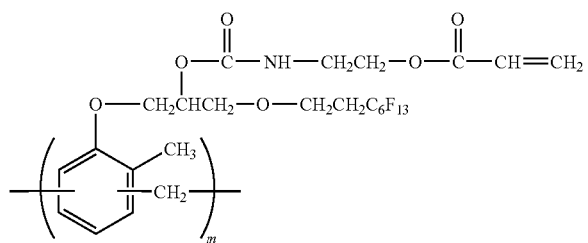
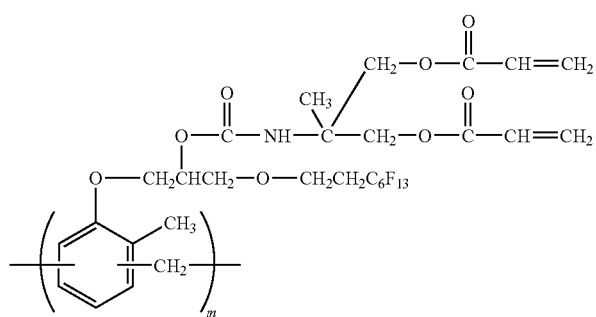
[Chemical formula 34]
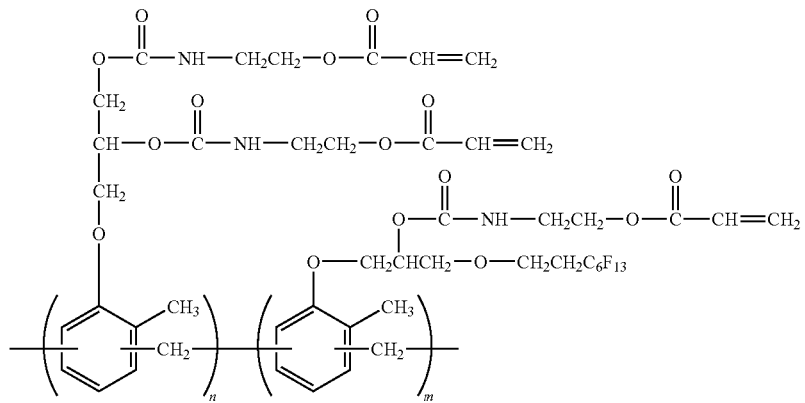
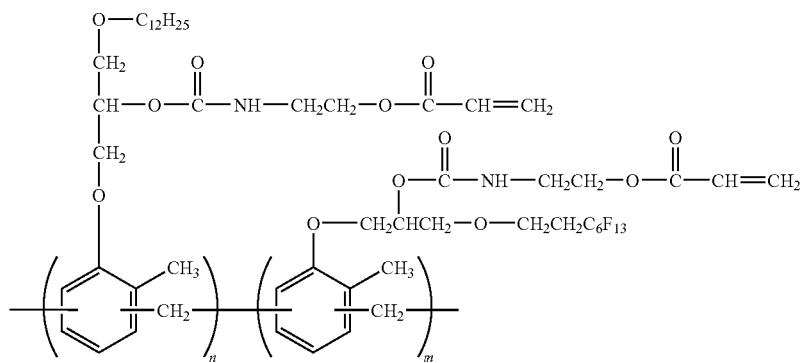

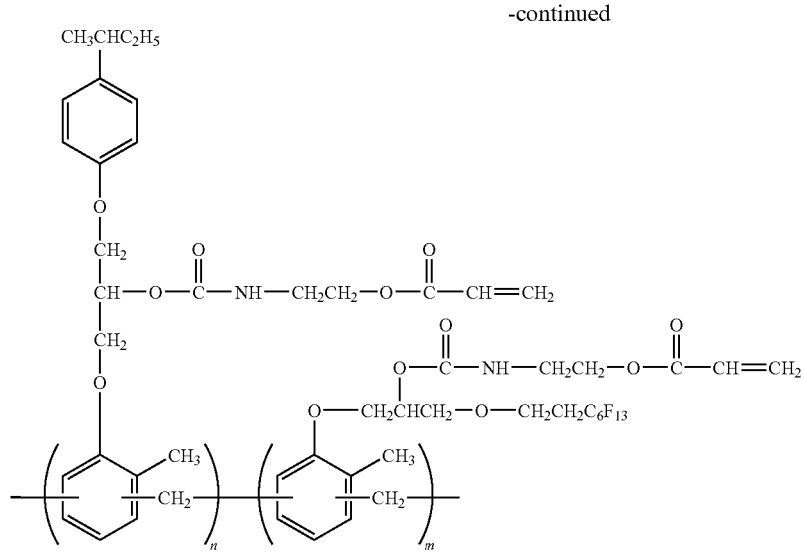
[Chemical formula 35]
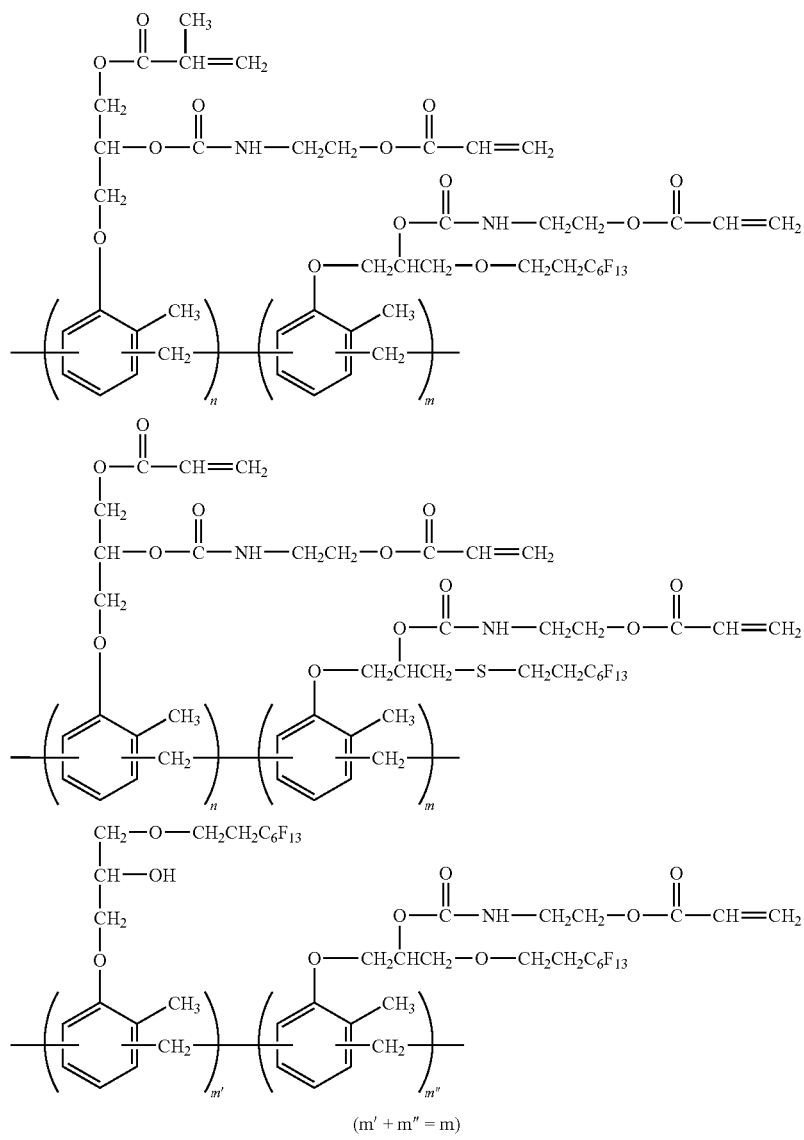
(m′ + m″ = m)

[Chemical formula 36]
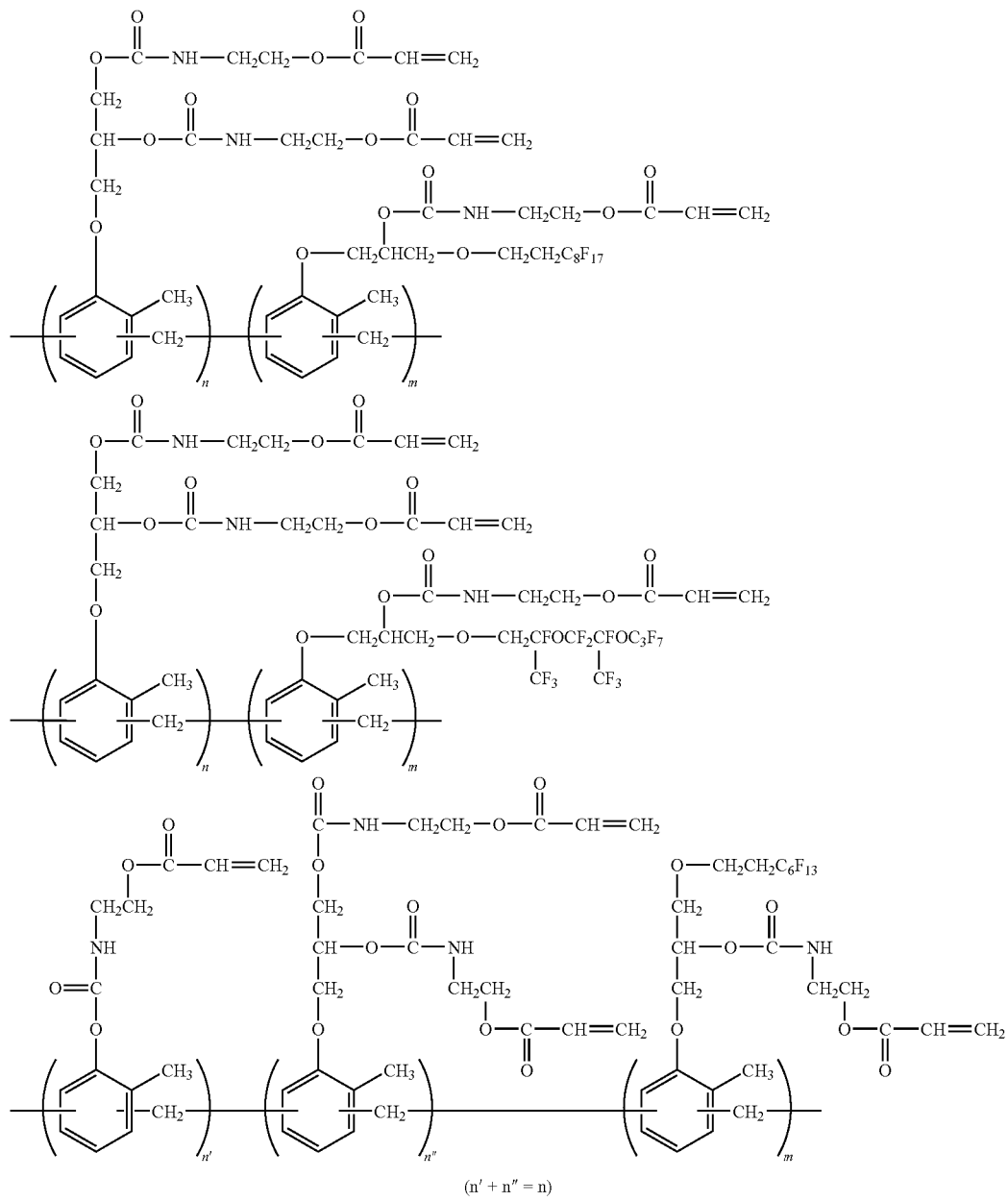
[Chemical formula 37]
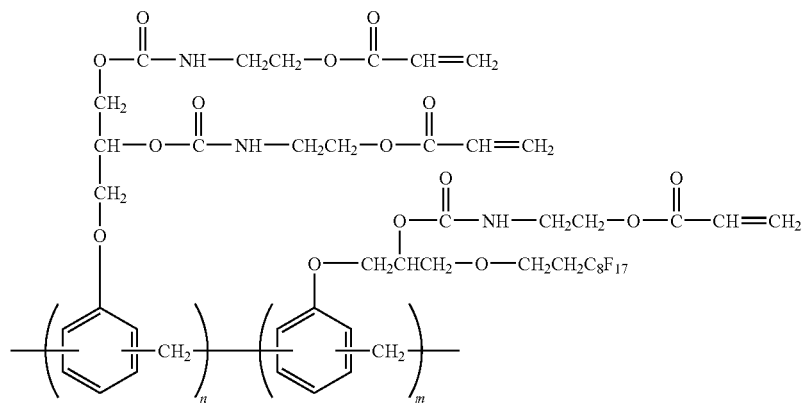

-continued
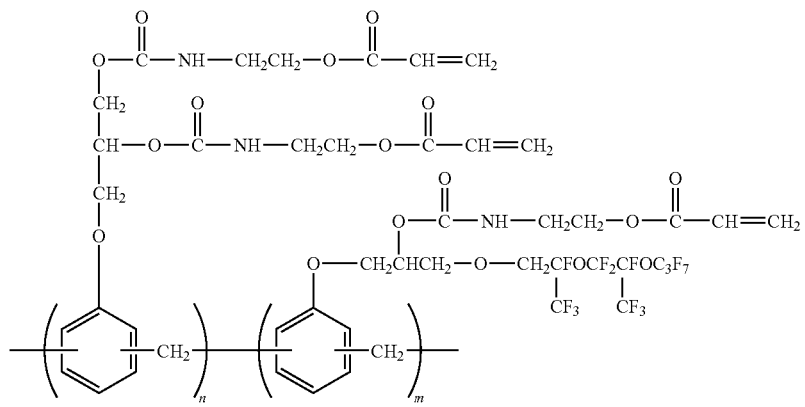
[Chemical formula 38]
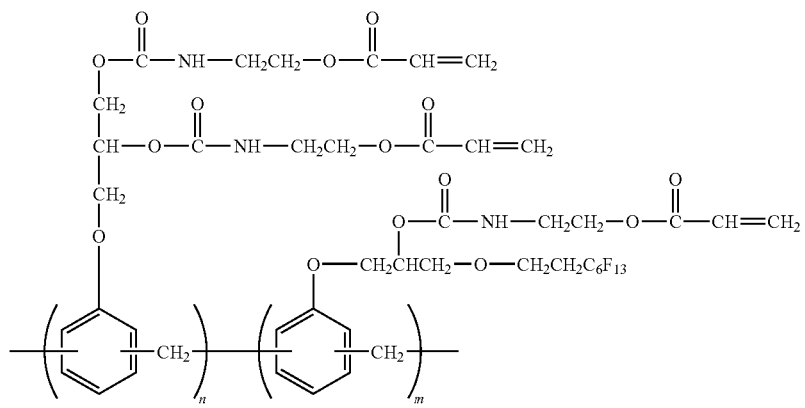
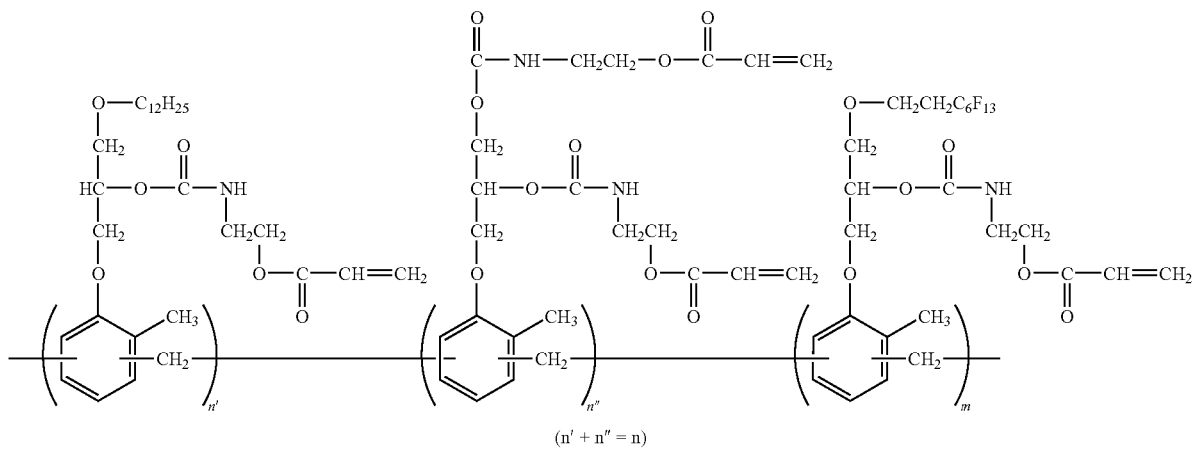
(n' + n″ = n)

-continued

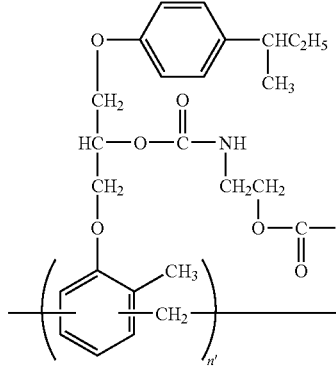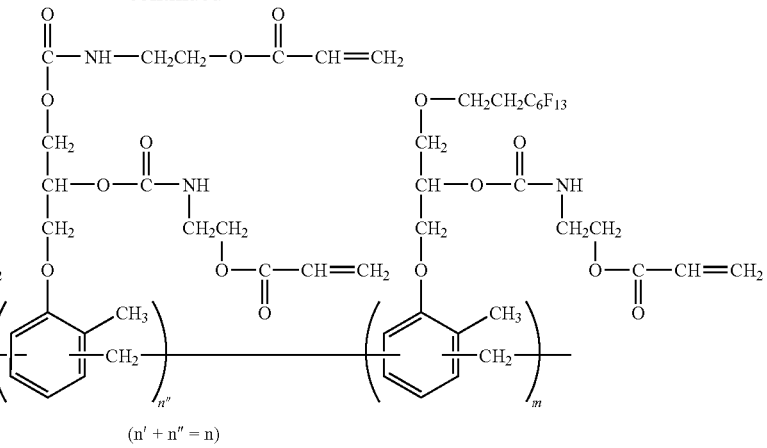

(n' + n" = n)

The fluorine-containing novolac resin according to the present invention can be used as a fluorine based surfactant on an "as is" basis and also be used as a fluorine based surfactant composition prepared by being mixed with various components depending on the purpose. Examples of such fluorine based surfactant compositions include fluorine based surfactant solutions prepared by dissolving the fluorine-containing novolac resin into organic solvents in advance and, furthermore, various compositions in which the fluorine-containing novolac resin and various resins, e.g., acrylic resins, phenol resins, polyester resins, urethane resins, urea resins, melamine resins, alkyd resins, epoxy resins, polyamide resins, polycarbonate resins, petroleum resins, fluororesins, and ultraviolet-curable resins; various organic or inorganic particles, e.g., acrylic resins, PTFE (polytetrafluoroethylene), polyethylenes, carbon, titanium oxide, alumina, copper, and silica fine particles; and various additives and the like in the related art, e.g., polymerization initiators, polymerization inhibitors, antistatic agents, antifoaming agents, viscosity modifiers, light resistance stabilizers, weather resistance stabilizers, heat resistance stabilizers, antioxidants, rust preventives, slip agents, wax, luster controllers, mold release agents, compatibilizers, electrical conductivity control agents, pigments, dyes, dispersing agents, dispersion stabilizers, and silicone-based, fluorine-based, or hydrocarbon-based surfactants, are combined.

It is preferable that the content of the fluorine-containing novolac resin according to the present invention in the above-described composition is 0.01 to 20 percent by weight, and particularly preferably 0.1 to 10 percent by weight from the viewpoint of the leveling property, the water repellency and oil repellency, the soiling resistance and, in addition, from the viewpoint of a low level of hindrance to the curing of the composition or the hardness and the transparency after drying.

Among the above-described compositions, the fluorine based surfactant solutions prepared by dissolving the fluorine-containing novolac resin according to the present invention into organic solvents are preferable because it is possible to handle as a liquid having good fluidity and, therefore, the handling is easy. Furthermore, a resin composition containing the fluorine-containing novolac resin according to the present invention, an organic solvent, and a curable resin is preferable because a coating film exhibiting excellent strength can be formed by volatilizing the solvent after coating and, in addition, conducting curing. Most of all, it is particularly preferable that the curable resin is an ultraviolet-curable resin because curing can be conducted with ultraviolet rays in a short time.

Examples of the organic solvents used for the above-described fluorine based surfactant solutions and the above-described resin compositions include ketones, esters, amides, sulfoxides, ethers, alcohols, and hydrocarbons. Most of all, acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethylsulfoxide, diethyl ether, diisopropyl ether, tetrahydrofuran, dioxane, methanol, ethanol, isopropanol, butanol, propylene glycol monomethyl ether, butyl cellosolve, toluene, and xylene are preferable on the grounds of excellent solubility and volatility.

As for the ultraviolet-curable resins used for the above-described resin compositions, it is enough that the resins are cured through application of ultraviolet rays. Examples thereof include (meth)acrylate monomers, polyfunctional (meth)acrylate monomers, (meth)acrylamide monomers, urethane (meth)acrylate resins, polyester (meth)acrylate resins, acrylic (meth)acrylate resins, and epoxy (meth)acrylate resins. Most of all, polyfunctional acrylate monomers, e.g., acrylate monomers and pentaerythritol hexaacrylate, acrylamide monomers, urethane acrylate resins, polyester acrylate resins, acrylic acrylate resins, and epoxy acrylate resins are preferable on the ground of excellent curability with ultraviolet rays. Furthermore, as for the thermosetting resins used for the above-described resin compositions, it is enough that the resins are cured through heating or mixing. Examples thereof include epoxy resins, phenol resins, melamine resins, benzoguanamine resins, urea resins, unsaturated polyester resins, and polyisocyanate resins. Most of all, epoxy resins, phenol resins, and unsaturated polyester resins are preferable because the reactivity with any one of reactive groups of an epoxy group, a phenolic hydroxyl group, and a (meth)acrylate group is the same type.

Examples of preferable uses of the resin composition containing the above-described fluorine-containing novolac resin, an organic solvent, and an ultraviolet-curable resin include a use in which the resin composition is used as an ultraviolet-curable resin composition for a hard coat of a polarizing plate of a liquid crystal display because of excellent soiling resistance of a hard coat surface and a use in which the resin composition is used as an ultraviolet-curable resist which is used for a black matrix or individual colors of red, green, and blue and which is used in production of a liquid crystal display color filter because the heat resistance is excellent, and the liquid repellency of the surface does not deteriorate, so that no contamination of other sections nor a production line with thermal decomposition volatiles occurs through even a treatment at a high temperature, such as 230° C.×30 minutes.

EXAMPLES

The present invention will be described below in more detail with reference to specific synthesis examples and examples. Incidentally, "parts" and "%" in the examples are on a weight basis, unless otherwise specified.

Example 1

A glass flask was provided with an agitator, a condenser, and a thermometer, and 68 parts of phenol novolac resin having the average number of nuclei of 6, 32 parts of fluorinated-alkyl-containing glycidyl compound:

[Chemical formula 39]

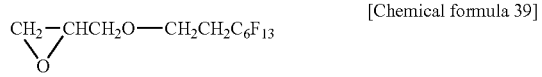

and 233 parts of propylene glycol monomethyl ether acetate serving as a solvent were put therein. The temperature was raised to 80° C. while agitation was conducted under a nitrogen stream, and 1.2 parts of tetramethylammonium chloride 50% aqueous solution serving as a catalyst was added. Thereafter, the temperature was raised to 140° C. and held for 10 hours so as to effect a reaction and, thereby, 334 parts of propylene glycol monomethyl ether acetate solution of 100 parts of compound (A-1) was obtained. Subsequently, the solution was poured into and spread on a stainless steel vat, and a heat-drying treatment was conducted at 150° C. for 30 minutes, so that 100 parts of compound (A-1) was obtained.

As a result of spectral analysis of the resulting compound (A-1), regarding the IR spectrum, peaks of OH group at 3,400 cm$^{-1}$, benzene ring at 1,400 to 1,650 cm$^{-1}$, and CF$_2$ group at 1,100 to 1,250 cm$^{-1}$ were detected. Furthermore, regarding the $^{13}$C-NMR spectrum (270 MHz), peaks were detected at a: 150.9 to 156.7 ppm, b (unsubstituted ortho position): 115.0 to 116.1 ppm, b (unsubstituted para position): 119.9 to 121.1 ppm, b (methylene-substituted ortho position, meta position, methylene-substituted para position): 127.5 to 134.9 ppm, c (ortho position-ortho position): 28.9 to 30.8 ppm, c (ortho position-para position): 35.3 to 35.8 ppm, c (para position-para position): 40.6 to 40.7 ppm, d: 69.6 to 70.0 ppm, e: 69.6 to 70.0 ppm, f: 72.8 ppm, g: 63.6 ppm, h: 31.4 to 32.0 ppm, and i: 106.0 to 122.3 ppm. The positions of carbon atoms to which the peaks belong are as described below.

[Chemical formula 40]

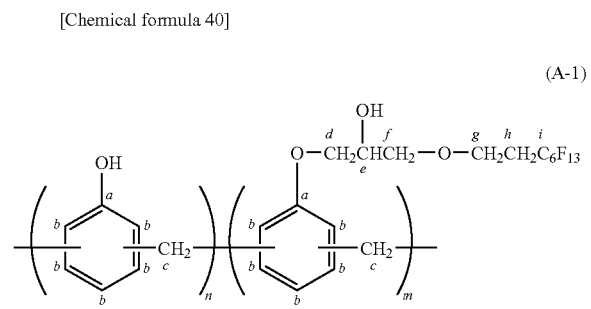

(A-1)

Example 2

A glass flask was provided with an agitator, a condenser, and a thermometer, and 70 parts of o-cresol novolac type epoxy resin having the average number of nuclei of 7, 30 parts of fluorinated-alkyl-containing thiol compound:

 [Chemical formula 41]

and 100 parts of methyl isobutyl ketone serving as a solvent were put therein. The temperature was raised to 80° C. while agitation was conducted under a nitrogen stream, and 0.1 parts of triphenyl phosphine serving as a catalyst was added. Thereafter, the temperature was raised to 117° C. and held for 15 hours so as to effect a reaction and, thereby, 200 parts of methyl isobutyl ketone solution of 100 parts of compound (A-2) was obtained. Subsequently, the solution was poured into and spread on a stainless steel vat, and a heat-drying treatment was conducted at 150° C. for 30 minutes, so that 100 parts of compound (A-2) was obtained.

As a result of spectral analysis of the resulting compound (A-2), regarding the IR spectrum, peaks of epoxy group at 910 cm$^{-1}$, OH group at 3,400 cm$^{-1}$, benzene ring at 1,400 to 1,650 cm$^{-1}$, and CF$_2$ group at 1,100 to 1,250 cm$^{-1}$ were detected. Furthermore, regarding the $^{13}$C-NMR spectrum (270 MHz), peaks were detected at a: 153.1 to 155.0 ppm, b (unsubstituted ortho position): 111.0 ppm, b (methyl-substituted ortho position, methylene-substituted ortho position, meta position, para position): 124.0 to 137.0 ppm, c (ortho position-ortho position): 29.8 ppm, c (ortho position-para position): 35.0 to 35.8 ppm, c (para position-para position): 40.1 to 40.5 ppm, d: 16.1 to 16.9 ppm, e: 68.6, 73.3 ppm, f: 50.4 ppm, g: 44.3 ppm, h: 74.5 ppm, i: 69.3 to 70.3 ppm, j: 69.3 to 70.3 ppm, k: 23.4 ppm, l: 31.7 to 32.3 ppm, and m: 105.7 to 121.9 ppm. The positions of carbon atoms to which the peaks belong are as described below.

[Chemical formula 42]

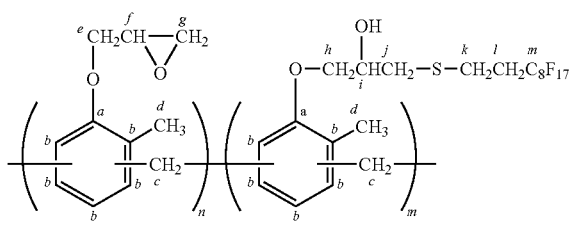

(A-2)

Example 3

A glass flask was provided with an agitator, a condenser, and a thermometer, and 65 parts of o-cresol novolac type epoxy resin having the average number of nuclei of 7, 35 parts of fluorinated-alkyl-containing thiol compound:

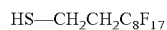 [Chemical formula 43]

and 67 parts of methyl isobutyl ketone serving as a solvent were put therein. The temperature was raised to 80° C. while agitation was conducted under a nitrogen stream, and 0.006 parts of tetrabutylphosphonium chloride 80% aqueous solution serving as a catalyst was added. Thereafter, the temperature was raised to 110° C. and held for 8 hours so as to effect a reaction. Then, the nitrogen stream was stopped, 20 parts of acrylic acid, 0.83 parts of triphenyl phosphine serving as a catalyst, 0.08 parts of hydroquinone serving as a polymerization inhibitor, and 40 parts of methyl isobutyl ketone serving as a solvent were added, followed by holding at 110° C. for 30 hours and, thereby, 228 parts of methyl isobutyl ketone solution of 120 parts of compound (A-3) was obtained. Subsequently, the solution was poured into and spread on a stainless steel vat, and a heat-drying treatment was conducted at 100° C. for 60 minutes, so that 120 parts of compound (A-3) was obtained.

As a result of spectral analysis of the resulting compound (A-3), regarding the IR spectrum, peaks of acryloyl group at 810, 1,410, and 1,650 cm$^{-1}$, ester group at 1,720 cm$^{-1}$, OH group at 3,450 cm$^{-1}$, benzene ring at 1,400 to 1,650 cm$^{-1}$, and $CF_2$ group at 1,100 to 1,250 cm$^{-1}$ were detected. Regarding the $^{13}$C-NMR spectrum (270 MHz), peaks were detected at a: 152.8 to 154.6 ppm, b (unsubstituted ortho position): 111.0 ppm, b (methyl-substituted ortho position, methylene-substituted ortho position, meta position, para position): 124.2 to 137.2 ppm, c (ortho position-ortho position): 29.6 ppm, c (ortho position-para position): 35.2 to 35.9 ppm, c (para position-para position): 40.4 ppm, d: 16.2 to 17.0 ppm, e: 68.5 to 69.4 ppm, f: 65.3 to 65.6 ppm, g: 65.3 to 65.6 ppm, h: 165.2 to 166.1 ppm, i: 129.8 ppm, j: 131.3 ppm, k: 74.6 ppm, l: 69.4 to 70.5 ppm, m: 69.4 to 70.5 ppm, n: 23.5 ppm, o: 31.8 to 32.4 ppm, and p: 105.7 to 121.9 ppm. The positions of carbon atoms to which the peaks belong are as described below.

[Chemical formula 44]

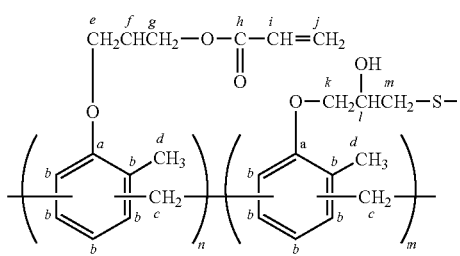

(A-3)

solution of a mixture of 121 parts of compound (A-4) and 48 parts of glycidyl methacrylate was obtained. Subsequently, the solution was poured into and spread on a stainless steel vat, and a heat-drying treatment was conducted at 100° C. for 60 minutes, so that 121 parts of compound (A-4) was obtained.

Figure 7:
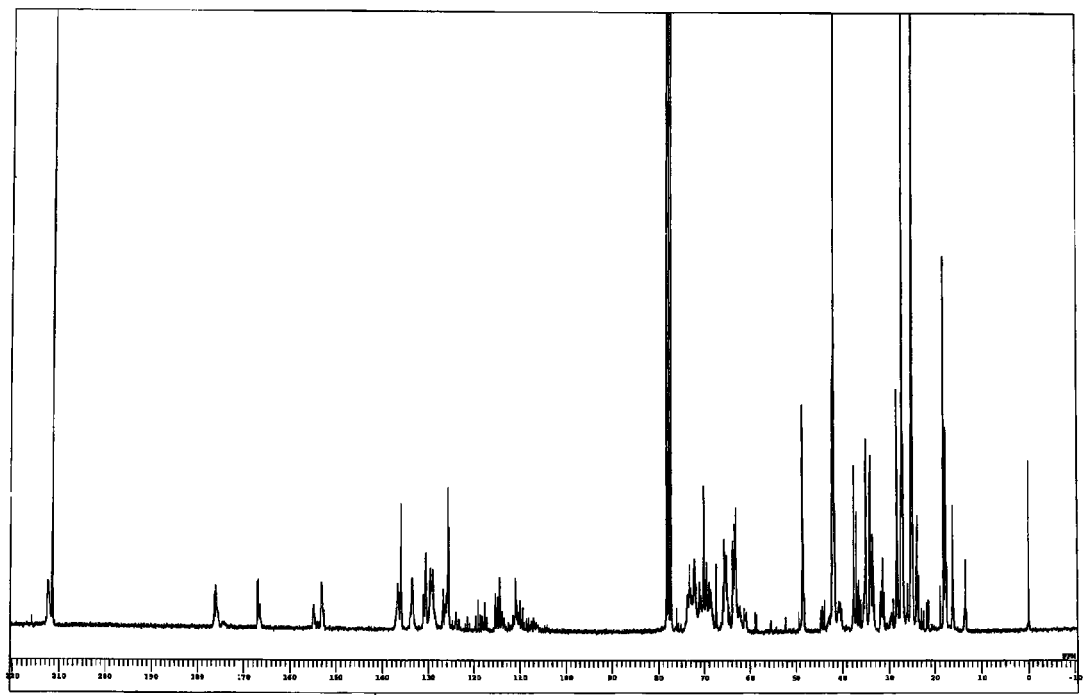
FIG. 7 is a $^{13}$C-NMR spectrum of the compound (A-4) obtained in Example 4.
Figure 8:
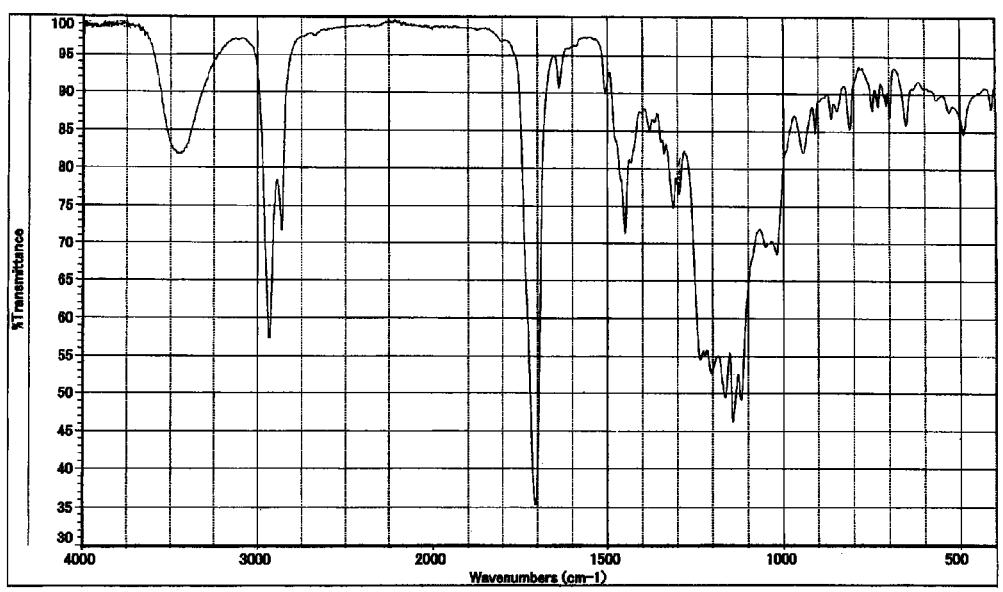
FIG. 8 is an IR spectrum of the compound (A-4) obtained in Example 4.
Figure 9:
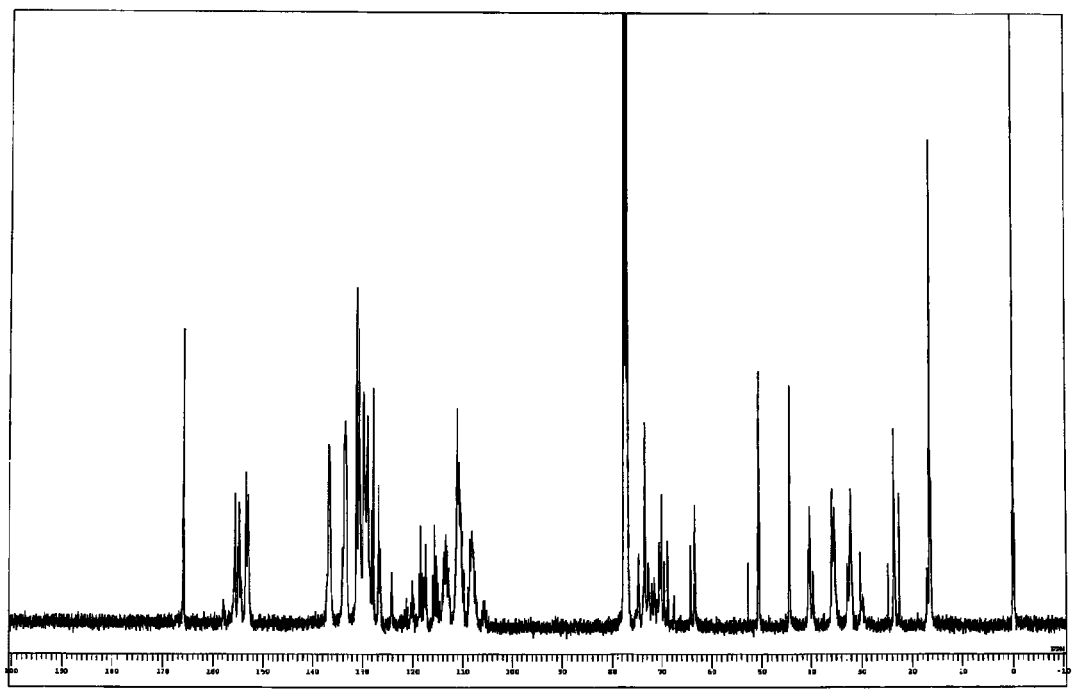
FIG. 9 is a $^{13}$C-NMR spectrum of the compound (A-5) obtained in Example 5.
Figure 10:
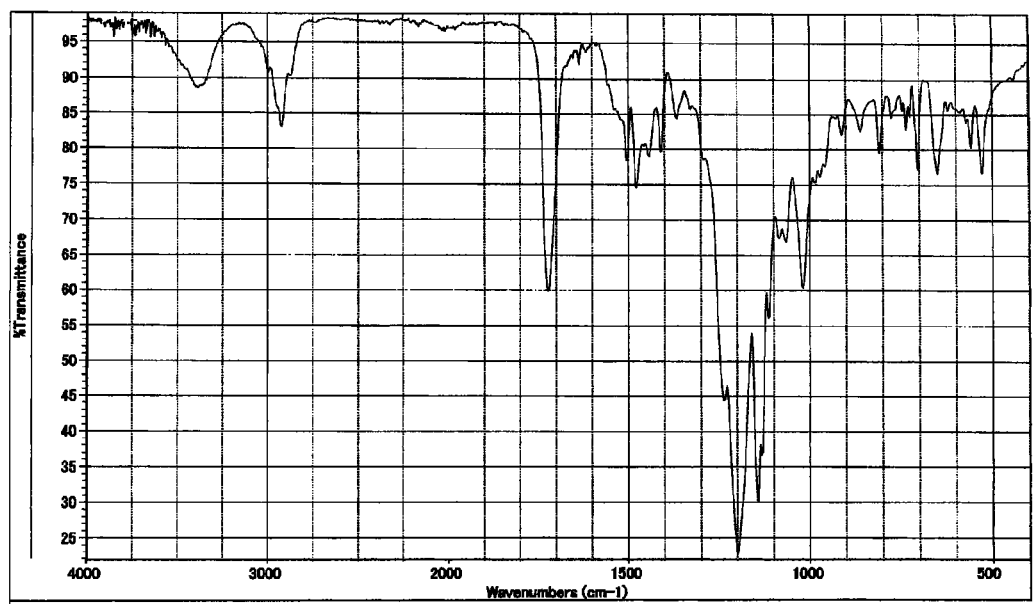
FIG. 10 is an IR spectrum of the compound (A-5) obtained in Example 5.
Figure 11:
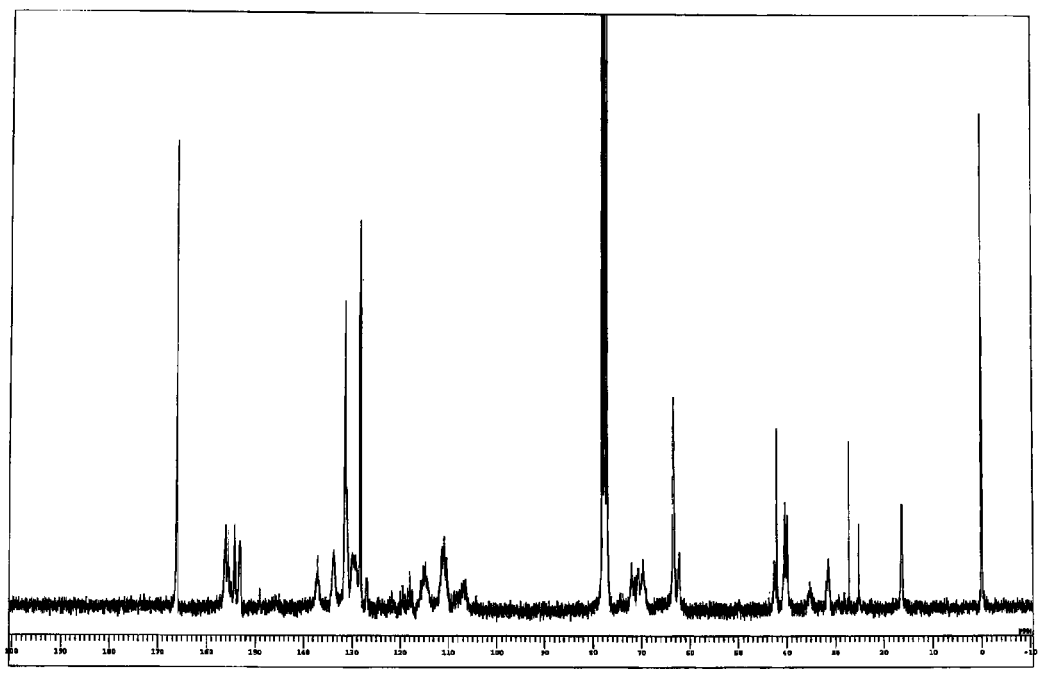
FIG. 11 is a $^{13}$C-NMR spectrum of the compound (A-6) obtained in Example 6.
Figure 12:
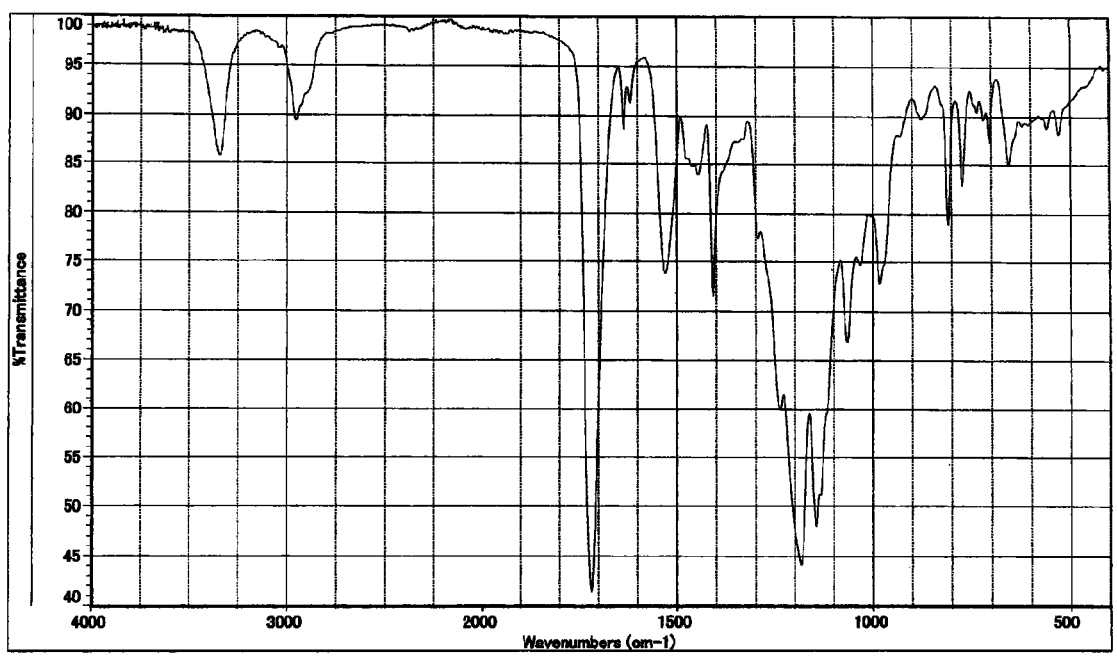
FIG. 12 is an IR spectrum of the compound (A-6) obtained in Example 6.
Figure 13:
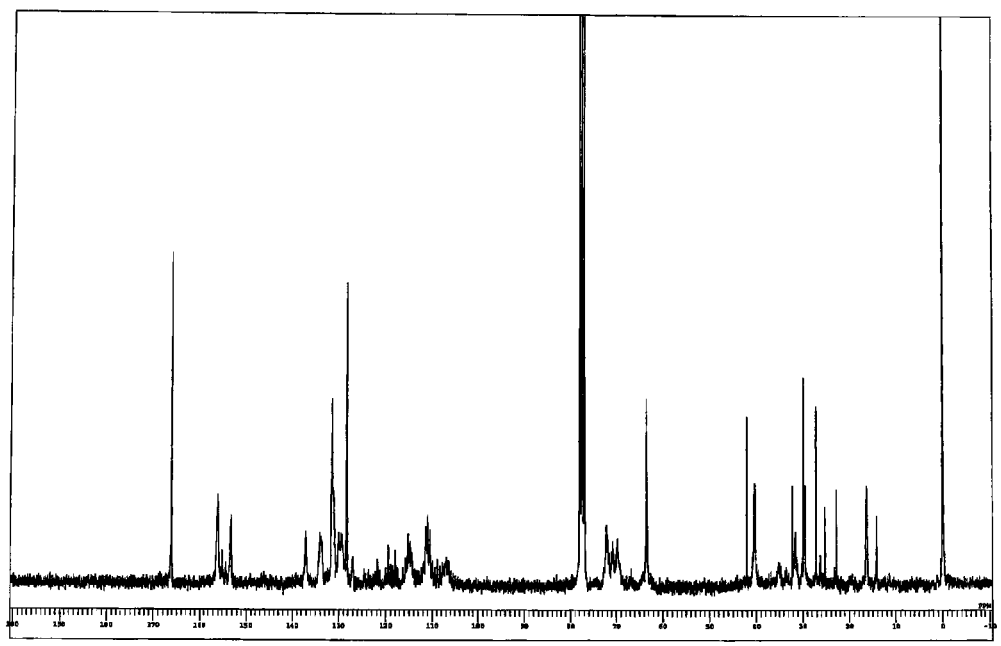
FIG. 13 is a $^{13}$C-NMR spectrum of the compound (A-7) obtained in Example 7.
Figure 14:
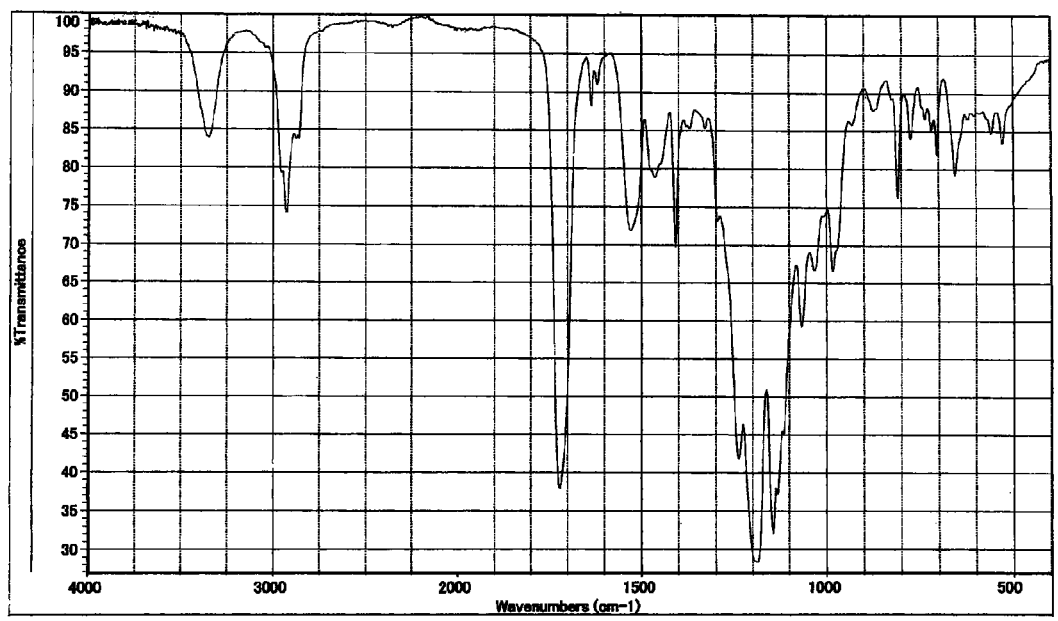
FIG. 14 is an IR spectrum of the compound (A-7) obtained in Example 7.

As a result of spectral analysis of the resulting compound (A-4), regarding the IR spectrum, peaks of methacryloyl group at 810 and 1,610 cm$^{-1}$, ester group at 1,720 cm$^{-1}$, OH group at 3,450 cm$^{-1}$, benzene ring at 1,400 to 1,500 cm$^{-1}$, and $CF_2$ group at 1,100 to 1,250 cm$^{-1}$ were detected. Furthermore, regarding the $^{13}$C-NMR spectrum (270 MHz), peaks were detected at a: 153.0 to 155.0 ppm, b (unsubstituted ortho position): 111.0 ppm, b (methyl-substituted ortho position, methylene-substituted ortho position, meta position, para position): 125.5 to 136.6 ppm, c (ortho position-ortho position): 29.6 ppm, c (ortho position-para position): 35.0 to 36.0 ppm, c (para position-para position): 40.4 ppm, d: 16.3 ppm, e: 68.7 to 69.4 ppm, f: 65.3 to 65.6 ppm, g: 65.3 to 65.6 ppm, h: 166.9 to 167.1 ppm, i: 135.9 ppm, j: 18.3 ppm, k: 125.8 ppm, l: 69.6 to 70.0 ppm, m: 69.6 to 70.0 ppm, n: 72.2 ppm, o: 63.6 ppm, p: 31.1 to 31.7 ppm, and q: 106.0 to 122.3. The positions of carbon atoms to which the peaks belong are as described below. In this regard, since the solvent (cyclohexanone) is contained in the sample, peaks of the solvent are also detected in the $^{13}$C-NMR spectrum shown in FIG. 7.

[Chemical formula 46]

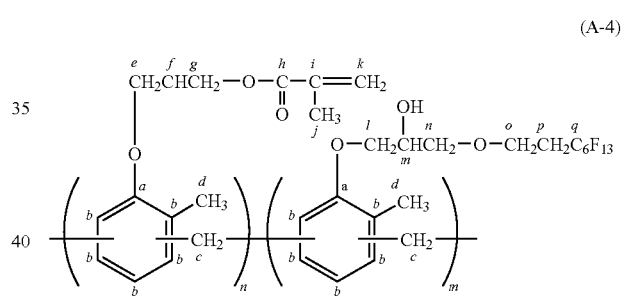

(A-4)

Example 4

A glass flask was provided with an agitator, a condenser, and a thermometer, and 36 parts of o-cresol novolac resin having the average number of nuclei of 7, 64 parts of fluorinated-alkyl-containing glycidyl compound:

[Chemical formula 45]

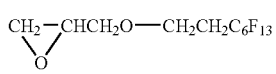

and 100 parts of cyclohexanone serving as a solvent were put therein. The temperature was raised to 80° C. while agitation was conducted under a nitrogen stream, and 0.25 parts of tetrabutylphosphonium hydroxide 40% aqueous solution serving as a catalyst was added. Thereafter, the temperature was raised to 150° C. and held for 10 hours so as to effect a reaction. Then, the nitrogen stream was stopped, 69 parts of glycidyl methacrylate, 0.42 parts of tetrabutylphosphonium hydroxide 40% aqueous solution serving as a catalyst, and 0.02 parts of hydroquinone monomethyl ether serving as a polymerization inhibitor were added, followed by holding at 130° C. for 5 hours and, thereby, 269 parts of cyclohexanone Example 5

A glass flask was provided with an agitator, a condenser, and a thermometer, and 44 parts of o-cresol novolac type epoxy resin having the average number of nuclei of 7, 56 parts of fluorinated-alkyl-containing thiol compound:

HS—$CH_2CH_2C_8F_{17}$ [Chemical formula 47]

and 100 parts of methyl isobutyl ketone serving as a solvent were put therein. The temperature was raised to 80° C. while agitation was conducted under a nitrogen stream, and 0.1 parts of triphenyl phosphine serving as a catalyst was added. Thereafter, the temperature was raised to 117° C. and held for 15 hours so as to effect a reaction. Then, the temperature of the product solution was lowered to 50° C., 0.05 parts of dibutyltin dilaurate serving as a catalyst and 0.05 parts of hydroquinone monomethyl ether serving as a polymerization inhibitor were added, and 18 parts of acryloyl-containing isocyanate compound:

[Chemical formula 48]

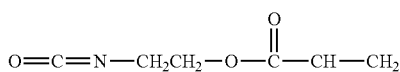

was dropped over 10 minutes while the inside of the flask was kept at 50° C. After the dropping was completed, the temperature was raised to 70° C. and was held for 6 hours so as to effect a reaction. After the reaction was completed, 500 parts of 1-mol/l hydrochloric acid was added and agitation was conducted so as to wash the product solution. After the washing, a hydrochloric acid layer was removed through liquid separation, and subsequently, washing and liquid separation were conducted likewise with 500 parts of water. Thereafter, 50 parts of magnesium sulfate serving as a desiccant was added, standing was conducted for one day, and the desiccant was separated through filtration, so that 214 parts of methyl isobutyl ketone solution of 114 parts of compound (A-5) was obtained. Subsequently, the solution was poured into and spread on a stainless steel vat, and a heat-drying treatment was conducted at 100° C. for 60 minutes, so that 114 parts of compound (A-5) was obtained.

As a result of spectral analysis of the resulting compound (A-5), regarding the IR spectrum, peaks of acryloyl group at 810 cm$^{-1}$, 1,410 cm$^{-1}$, and 1,650 cm$^{-1}$, epoxy group at 910 cm$^{-1}$, urethane group at 1,540 cm$^{-1}$ and 1,720 cm$^{-1}$, ester group at 1,720 cm$^{-1}$, and $CF_2$ group at 1,100 to 1,250 cm$^{-1}$ were detected. Furthermore, regarding the $^{13}$C-NMR spectrum (270 MHz), peaks were detected at a: 153.3 to 155.8 ppm, b (unsubstituted ortho position): 111.1 ppm, b (methyl-substituted ortho position, methylene-substituted ortho position, meta position, para position): 124.0 to 136.8 ppm, c (ortho position-ortho position): 29.8 ppm, c (ortho position-para position): 35.5 to 36.1 ppm, c (para position-para position): 40.3 to 40.5 ppm, d: 16.3 to 17.1 ppm, e: 68.8 and 73.5 ppm, f: 50.6 ppm, g: 44.5 ppm, h: 74.8 ppm, i: 69.5 to 70.5 ppm, j: 69.5 to 70.5 ppm, k: 23.5 ppm, l: 32.2 to 32.9 ppm, m: 105.7 to 121.9 ppm, n: 155.8 ppm, o: 40.3 ppm, p: 63.3 ppm, q: 165.8 ppm, r: 131.1 ppm, and s: 128.1 ppm. The positions of carbon atoms to which the peaks belong are as described below.

[Chemical formula 49]

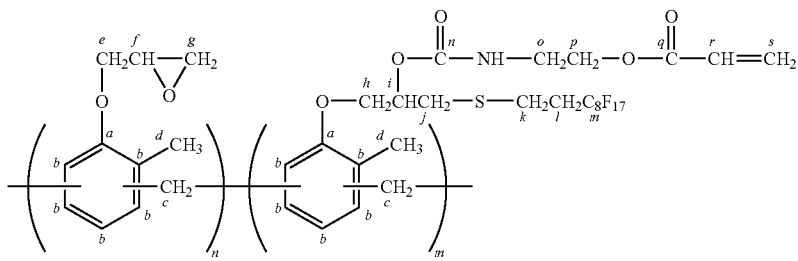

(A-5)

Example 6

A glass flask was provided with an agitator, a condenser, and a thermometer, and 100 parts of o-cresol novolac resin having the average number of nuclei of 7,280 parts of fluorinated-alkyl-containing glycidyl compound:

[Chemical formula 50]

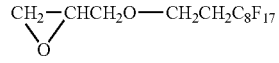

and 254 parts of cyclohexanone serving as a solvent were put therein. The temperature was raised to 80° C. while agitation was conducted under a nitrogen stream, and 4.8 parts of tetramethylammonium hydroxide 40% aqueous solution serving as a catalyst was added. Thereafter, the temperature was raised to 150° C. and held for 6 hours so as to effect a reaction. Then, 30 parts of glycidol was added and a reaction was effected by holding for 30 hours at 150° C. Next, the temperature of the product solution was lowered to 70° C., 0.05 parts of dibutyltin dilaurate serving as a catalyst and 0.05 parts of hydroquinone monomethyl ether serving as a polymerization inhibitor were added, and 188 parts of acryloyl-containing isocyanate compound:

[Chemical formula 51]

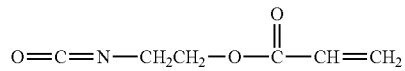

was dropped over 1 hour while the inside of the flask was kept at 70° C. After the dropping was completed, a reaction was effected by holding for 6 hours at 70° C. After the reaction was completed, 500 parts of 1-mol/l hydrochloric acid was added and agitation was conducted so as to wash the product solution. After the washing, a hydrochloric acid layer was removed through liquid separation, and subsequently, washing and liquid separation were conducted likewise with 500 parts of water. Thereafter, 50 parts of magnesium sulfate serving as a desiccant was added, standing was conducted for one day, and the desiccant was separated through filtration, so that 854 parts of cyclohexanone solution of 600 parts of compound (A-6) was obtained. Subsequently, the solution was poured into and spread on a stainless steel vat, and a heat-drying treatment was conducted at 100° C. for 60 minutes, so that 600 parts of compound (A-6) was obtained.

As a result of spectral analysis of the resulting compound (A-6), regarding the IR spectrum, peaks of acryloyl group at 810 cm$^{-1}$, 1,410 cm$^{-1}$, and 1,650 cm$^{-1}$, urethane group at 1,540 cm$^{-1}$ and 1,720 cm$^{-1}$, ester group at 1,720 cm$^{-1}$, and $CF_2$ group at 1,100 to 1,250 cm$^{-1}$ were detected. Furthermore, regarding the $^{13}$C-NMR spectrum (270 MHz), peaks were detected at a: 153.2 to 155.4 ppm, b (unsubstituted ortho position): 110.9 ppm, b (methyl-substituted ortho position, methylene-substituted ortho position, meta position, para position): 124.0 to 137.1 ppm, c (ortho position-ortho position): 29.8 ppm, c (ortho position-para position): 35.5 ppm, c (para position-para position): 40.3 ppm, d: 16.3 ppm, e, f, and g: 68.5 to 73.0 pm, h: 63.5 ppm, i: 31.5 ppm, j: 105.7 to 121.9 ppm, k: 156.0 ppm, l: 40.3 ppm, m: 63.5 ppm, n: 166.1 ppm, o: 131.4 ppm, and p: 128.3 ppm. The positions of carbon atoms to which the peaks belong are as described below.

[Chemical formula 52]

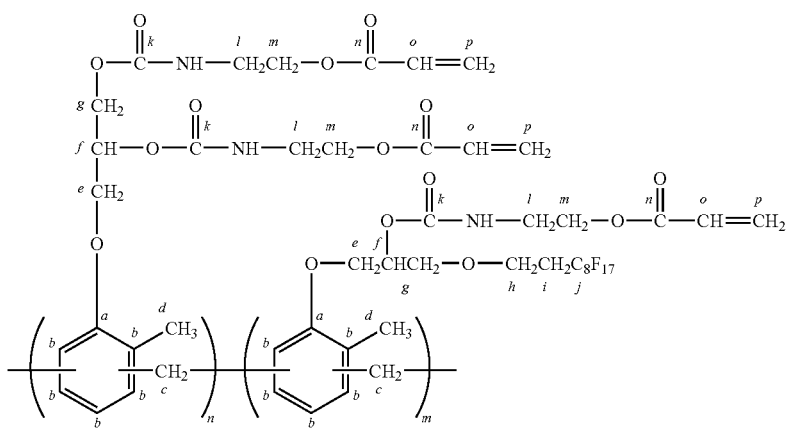

(A-6)

Example 7

A glass flask was provided with an agitator, a condenser, and a thermometer, and 100 parts of o-cresol novolac resin having the average number of nuclei of 7,292 parts of fluorinated-alkyl-containing glycidyl compound:

[Chemical formula 53]

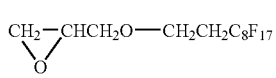

and 65 parts of mixture (epoxy equivalent=283 g/eq) of dodecyl glycidyl ether and tridecyl glycidyl ether, and 305 parts of cyclohexanone serving as a solvent were put therein. The temperature was raised to 80° C. while agitation was conducted under a nitrogen stream, and 5.7 parts of tetramethylammonium hydroxide 40% aqueous solution serving as a catalyst was added. Thereafter, the temperature was raised to 150° C. and held for 30 hours so as to effect a reaction. Then, 12 parts of glycidol was added and a reaction was effected by holding for 15 hours at 150° C. Next, the temperature of the product solution was lowered to 70° C., 0.5 parts of dibutyltin dilaurate serving as a catalyst and 1 part of hydroquinone monomethyl ether serving as a polymerization inhibitor were added, and 152 parts of acryloyl-containing isocyanate compound:

[Chemical formula 54]

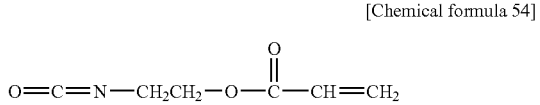

was dropped over 1 hour while the inside of the flask was kept at 70° C. After the dropping was completed, a reaction was effected by holding for 6 hours at 70° C. After the reaction was completed, 500 parts of 1-mol/l hydrochloric acid was added and agitation was conducted so as to wash the product solution. After the washing, a hydrochloric acid layer was removed through liquid separation, and subsequently, washing and liquid separation were conducted likewise with 500 parts of water. Thereafter, 50 parts of magnesium sulfate serving as a desiccant was added, standing was conducted for one day, and the desiccant was separated through filtration, so that 917 parts of cyclohexanone solution of 612 parts of compound (A-7) was obtained. Subsequently, the solution was poured into and spread on a stainless steel vat, and a heat-drying treatment was conducted at 100° C. for 60 minutes, so that 612 parts of compound (A-7) was obtained.

As a result of spectral analysis of the resulting compound (A-7), regarding the IR spectrum, peaks of acryloyl group at 810 cm$^{-1}$, 1,410 cm$^{-1}$, and 1,650 cm$^{-1}$, urethane group at 1,540 cm$^{-1}$ and 1,720 cm$^{-1}$, ester group at 1,720 cm$^{-1}$, dodecyl group and tridecyl group at 2,800 to 3,000 cm$^{-1}$, and CF$_2$ group at 1,100 to 1,250 cm$^{-1}$ were detected. Furthermore, regarding the $^{13}$C-NMR spectrum (270 MHz), peaks were detected at a: 153.2 to 156.1 ppm, b (unsubstituted ortho position): 110.0 ppm, b (methyl-substituted ortho position, methylene-substituted ortho position, meta position, para position): 124.0 to 137.1 ppm, c (ortho position-ortho position): 29.8 ppm, c (ortho position-para position): 36.0 ppm, c (para position-para position): 40.4 pm, d: 16.3 ppm, e, f, and g: 69.8 to 72.2 ppm, h: 63.5 ppm, i: 31.5 ppm, j: 106.0 to 122.0 ppm, k: 156.1 ppm, l: 40.4 ppm, m: 63.5 ppm, n: 166.1 ppm, o: 131.4 ppm, p: 128.2 ppm, and q: 14.2 ppm, 22.9 ppm, 26.1 ppm, 29.9 ppm, 31.5 ppm, and 35.2 ppm. The positions of carbon atoms to which the peaks belong are as described below.

[Chemical formula 55]

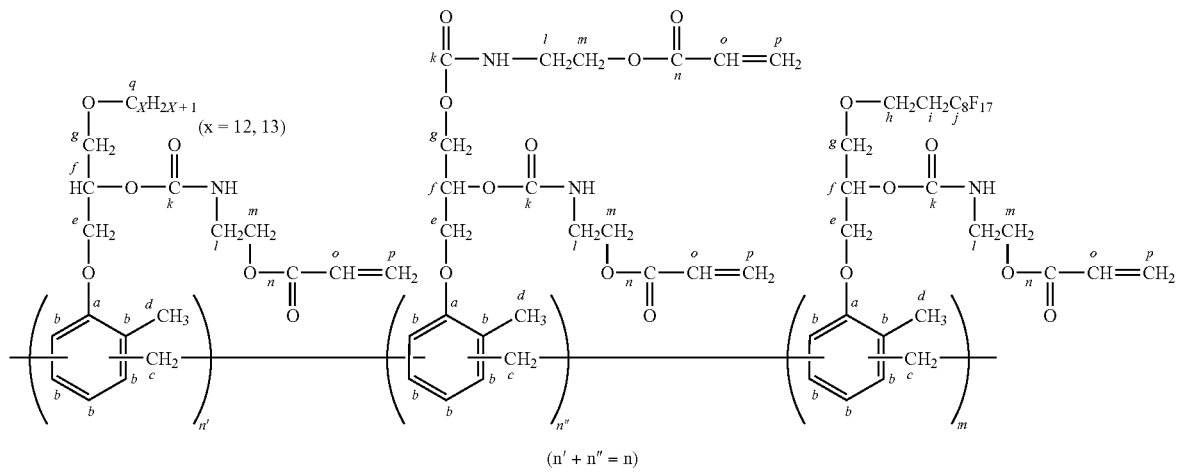

(A-7)

Example 8

A glass flask was provided with an agitator, a condenser, and a thermometer, and 100 parts of phenol novolac resin having the average number of nuclei of 4,260 parts of fluorinated-alkyl-containing glycidyl compound:

[Chemical formula 56]

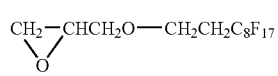

and 240 parts of cyclohexanone serving as a solvent were put therein. The temperature was raised to 80° C. while agitation was conducted under a nitrogen stream, and 4.5 parts of tetramethylammonium hydroxide 40% aqueous solution serving as a catalyst was added. Thereafter, the temperature was raised to 150° C. and held for 6 hours so as to effect a reaction. Then, 40 parts of glycidol was added and a reaction was effected by holding for 30 hours at 150° C. Next, the temperature of the product solution was lowered to 70° C., 0.05 parts of dibutyltin dilaurate serving as a catalyst and 0.05 parts of hydroquinone monomethyl ether serving as a polymerization inhibitor were added, and 221 parts of acryloyl-containing isocyanate compound:

[Chemical formula 57]

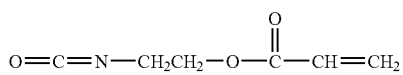

was dropped over 1 hour while the inside of the flask was kept at 70° C. After the dropping was completed, a reaction was effected by holding for 6 hours at 70° C., so that 863 parts of cyclohexanone solution of 623 parts of compound (A-8) was obtained. Subsequently, the solution was poured into and spread on a stainless steel vat, and a heat-drying treatment was conducted at 100° C. for 60 minutes, so that 623 parts of compound (A-8) was obtained.

[Chemical formula 58]

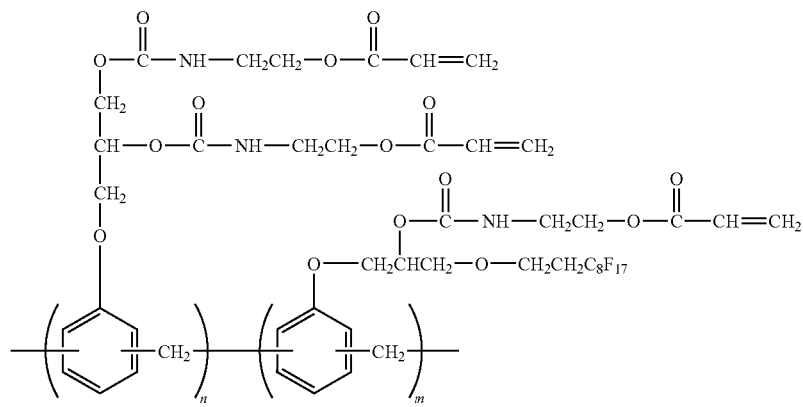

(A-8)

Example 9

A glass flask was provided with an agitator, a condenser, and a thermometer, and 100 parts of phenol novolac resin having the average number of nuclei of 4,320 parts of fluorinated-alkyl-containing glycidyl compound:

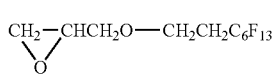

[Chemical formula 59]

and 280 parts of cyclohexanone serving as a solvent were put therein. The temperature was raised to 80° C. while agitation was conducted under a nitrogen stream, and 5.3 parts of tetramethylammonium hydroxide 40% aqueous solution serving as a catalyst was added. Thereafter, the temperature was raised to 150° C. and held for 6 hours so as to effect a reaction. Then, 21 parts of glycidol was added and a reaction was effected by holding for 30 hours at 150° C. Next, the temperature of the product solution was lowered to 70° C., 0.05 parts of dibutyltin dilaurate serving as a catalyst and 0.05 parts of hydroquinone monomethyl ether serving as a polymerization inhibitor were added, and 185 parts of acryloyl-containing isocyanate compound:

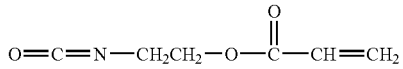

[Chemical formula 60]

was dropped over 1 hour while the inside of the flask was kept at 70° C. After the dropping was completed, a reaction was effected by holding for 6 hours at 70° C., so that 908 parts of cyclohexanone solution of 628 parts of compound (A-9) was obtained. Subsequently, the solution was poured into and spread on a stainless steel vat, and a heat-drying treatment was conducted at 100° C. for 60 minutes, so that 628 parts of compound (A-9) was obtained.

Example 10

A glass flask was provided with an agitator, a condenser, and a thermometer, and 100 parts of phenol novolac resin having the average number of nuclei of 4, 270 parts of fluorinated-alkyl-containing glycidyl compound:

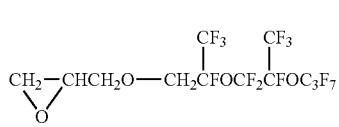

[Chemical formula 62]

and 247 parts of cyclohexanone serving as a solvent were put therein. The temperature was raised to 80° C. while agitation was conducted under a nitrogen stream, and 4.6 parts of tetramethylammonium hydroxide 40% aqueous solution serving as a catalyst was added. Thereafter, the temperature was raised to 150° C. and held for 6 hours so as to effect a reaction. Then, 40 parts of glycidol was added and a reaction was effected by holding for 30 hours at 150° C. Next, the temperature of the product solution was lowered to 70° C., 0.05 parts of dibutyltin dilaurate serving as a catalyst and 0.05 parts of hydroquinone monomethyl ether serving as a polymerization inhibitor were added, and 221 parts of acryloyl-containing isocyanate compound:

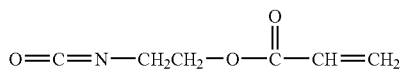

[Chemical formula 63]

was dropped over 1 hour while the inside of the flask was kept at 70° C. After the dropping was completed, a reaction was effected by holding for 6 hours at 70° C., so that 880 parts of cyclohexanone solution of 633 parts of compound (A-10) was obtained. Subsequently, the solution was poured into and spread on a stainless steel vat, and a heat-drying treatment was conducted at 100° C. for 60 minutes, so that 633 parts of compound (A-10) was obtained.

[Chemical formula 61]

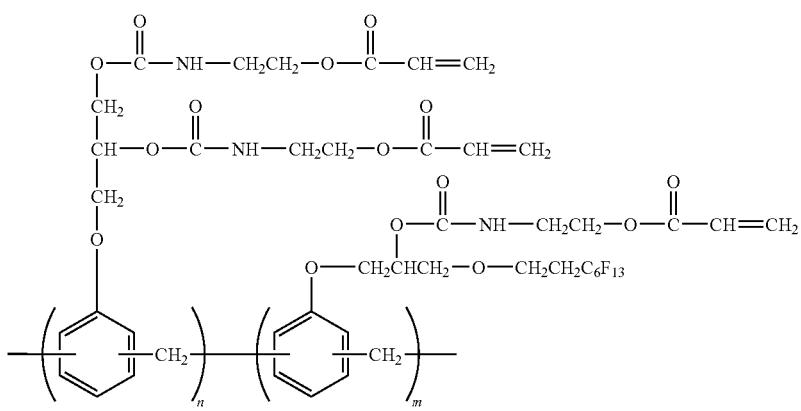

(A-9)

[Chemical formula 64]

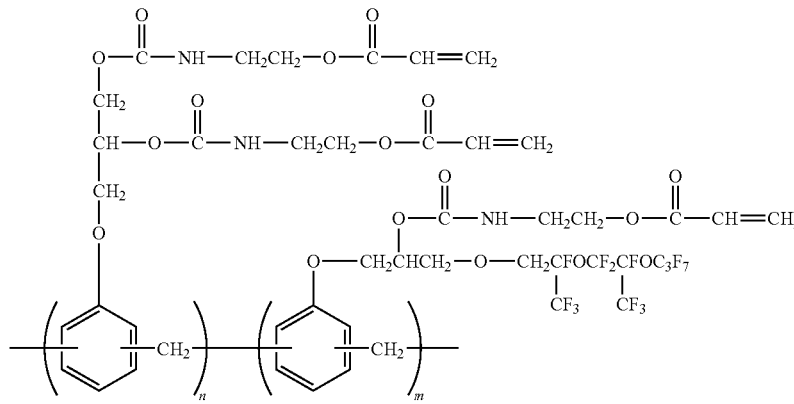

Comparative Example 1

A glass flask was provided with an agitator, a condenser, and a thermometer, and 50 parts of acrylate including an ethylene oxide chain and a propylene oxide chain:

[Chemical formula 65]

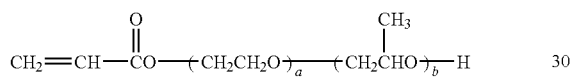

(a=1 to 20, b=1 to 20), 50 parts of fluorinated-alkyl-containing acrylate:

[Chemical formula 66]

and 400 parts of isopropyl alcohol were put therein. Under heating at 80° C. in a nitrogen stream, 4 parts of azobisisobutylonitrile serving as a polymerization initiator was added and, thereafter, a polymerization reaction was completed by heating at 80° C. for 15 hours. Subsequently, the solvent was removed at 80° C. under a reduced pressure, so that 101 parts of copolymer (B-1) was obtained.

[Chemical formula 67]

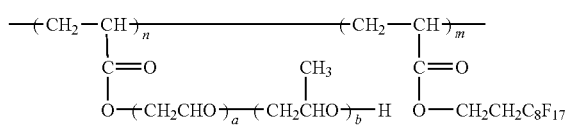

Comparative Example 2

An autoclave was provided with an agitator, a thermometer, and a pressure gauge, and 17 parts of phenol novolac resin having the average number of nuclei of 4, 39 parts of ethylene oxide, and 0.03 parts of sodium hydroxide were put therein. A reaction was effected at 120° C. for 11 hours while agitation was conducted. Thereafter, the reaction mixture was cooled to room temperature, so that 50 parts of phenol novolac resin including an ethylene oxide chain added:

[Chemical formula 68]

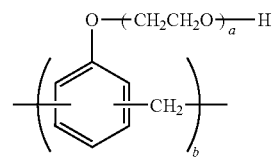

was obtained.

Then, a glass flask was provided with an agitator, a condenser, a thermometer, and a dropping device, and 50 parts of the resulting phenol novolac resin, 11 parts of triethylamine, and 400 parts of carbon tetrachloride were put therein. A solution in which 54 parts of fluorinated-alkyl-containing carboxylic acid chloride:

[Chemical formula 69]

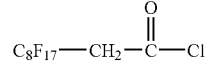

and 100 parts of carbon tetrachloride were mixed was dropped slowly while agitation was conducted. After the dropping was completed, a reaction was effected 4 hours. Subsequently, triethylamine hydrochloride was separated through filtration, and carbon tetrachloride was distilled from the filtrate, so that 100 parts of compound (B-2) was obtained.

[Chemical formula 70]

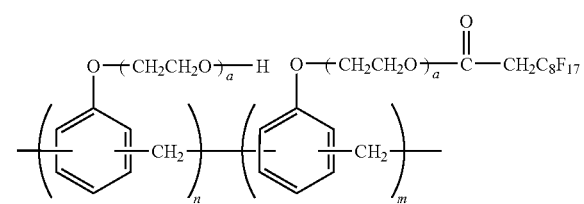

Examples 11 to 17 and Comparative Examples 3 to 5

Regarding the ultraviolet-curable coating composition, 125 parts of UNIDIC 17-806 (butyl acetate solution containing 80% of ultraviolet-curable urethane acrylate resin, produced by DIC Corporation), 5 parts of IRGACURE 184 (produced by Ciba Specialty Chemicals) serving as a photopolymerization initiator, and 55 parts of toluene, 28 parts of 2-propanol, 28 parts of ethyl acetate, and 28 parts of propylene glycol monomethyl ether, which served as solvents, were mixed and dissolved so as to obtain 269 parts of ultraviolet-curable coating composition.

Addition and mixing of 1 part of any one of the compounds (A-3), (A-4), (A-6) to (A-10), (B-1), and (B-2), which were obtained in Examples 3, 4, 6 to 10, and Comparative examples 1 and 2 and which served as fluorine based surfactants, to 269 parts of the resulting ultraviolet-curable coating composition were conducted. The resulting ultraviolet-curable coating material was applied to a TAC film having a thickness of 80 μm by using a bar coater No. 13. Thereafter, the solvent was subjected to volatilization in a drier at 60° C. for 5 minutes, and curing was conducted with an ultraviolet-curing apparatus (in a nitrogen atmosphere, using a high pressure mercury vapor lamp, the amount of ultraviolet irradiation of 2 kJ/m$^2$), so that a coating film was produced. Likewise, a coating film was produced with respect to an ultraviolet-curable coating composition including no fluorine based surfactant. In this regard, the fluorine based surfactant of compound (A-1) obtained in Example 1 was not suitable for the evaluation with the ultraviolet curing system on the grounds that the phenolic hydroxyl groups were included and, thereby, curing was interfered. The fluorine based surfactants of compound (A-2) obtained in Example 2 and the compound (A-5) obtained in Example 5 were not suitable for the evaluation with the ultraviolet curing system on the grounds that the epoxy groups were included and, thereby, reactive epoxy groups remained after the curing. Therefore, they were used in the evaluation with the thermosetting system described in the next item.

A line was drawn on a coating surface of the resulting coating film with a felt pen (MAGIC INK, large, blue, produced by Teranishi Chemical Industry Co., Ltd.), the state of adhesion of the blue ink was observed and, thereby, an evaluation of the soiling resistance (evaluation of film untreated with strong alkaline water) was conducted.

Furthermore, after the ultraviolet curing, the film was subjected to an immersion treatment in a strong alkaline water (2-mol/l KOH aqueous solution) at 70° C. for 1 minute. Subsequently, washing with pure water, drying at 100° C. for 3 minutes, and standing to cool at room temperature were conducted. The resulting coating film was subjected to the evaluation of soiling resistance (evaluation of film treated with strong alkaline water) by using the felt pen likewise. The evaluation results thereof are shown in Table 1.

TABLE 1

| | Fluorine based surfactant Compound | Soiling resistance | |
|---|---|---|---|
| | | Film untreated with strong alkaline water | Film treated with strong alkaline water |
| Example 11 | A-3 | ⊙ | ○ |
| Example 12 | A-4 | ○ | ○ |
| Example 13 | A-6 | ⊙ | ⊙ |
| Example 14 | A-7 | ⊙ | ⊙ |
| Example 15 | A-8 | ⊙ | ⊙ |
| Example 16 | A-9 | ⊙ | ⊙ |
| Example 17 | A-10 | ⊙ | ⊙ |
| Comparative example 3 | none | XX | XX |
| Comparative example 4 | B-1 | ○ | X |

TABLE 1-continued

| | Fluorine based surfactant Compound | Soiling resistance | |
|---|---|---|---|
| | | Film untreated with strong alkaline water | Film treated with strong alkaline water |
| Comparative example 5 | B-2 | ○ | X |

<Evaluation Criteria of Soiling Resistance>

⊙: The soiling resistance is the best, and the ink is repelled into the shape of beads.

o: The ink is not repelled in the shape of beads, but is repelled in the shape of a line because of weaker repellency.

Δ: The ink is not repelled even in the shape of a line, but is repelled partly because of still weaker repellency.

x: The ink is repelled slightly.

xx: The soiling resistance is the poorest, and the ink is not repelled at all, so that drawing is made on a surface clearly.

Examples 18 to 20 and Comparative Examples 6 to 8

Regarding the thermosetting type coating composition, 86 parts of EPICLON 1050 (bisphenol A type solid epoxy resin, produced by DIC Corporation) serving as a thermosetting type coating composition, 18 parts of PHENOLITE TD-2131 (phenol novolac resin, produced by DIC Corporation) serving as a curing agent, 1 part of triphenylphosphine serving as a curing catalyst, and 55 parts of toluene, 28 parts of 2-propanol, 28 parts of ethyl acetate, 28 parts of propylene glycol monomethyl ether, and 25 parts of butyl acetate, which served as solvents, were mixed and dissolved so as to obtain 269 parts of thermosetting type coating composition.

Addition and mixing of 1 part of any one of the compounds (A-1), (A-2), (A-5), (B-1), and (B-2), which were obtained in Examples 1, 2, and 5, and Comparative examples 1 and 2 and which served as fluorine based surfactants, to 269 parts of the resulting thermosetting type coating composition were conducted. The resulting thermosetting type coating material was applied to a glass plate having a thickness of 2 mm by using a bar coater No. 13. Thereafter, the solvent was subjected to volatilization in a drier at 170° C. for 1 hour and, in addition, heat-curing was effected. Subsequently, standing to cool was conducted, so that a coating film was produced. Likewise, a coating film was produced with respect to thermosetting type coating composition including no fluorine based surfactant.

A line was drawn on a coating surface of the resulting coated plate with a felt pen (Magic Ink, large, blue, produced by Teranishi Chemical Industry Co., Ltd.), the state of adhesion of the blue ink was observed and, thereby, an evaluation of the soiling resistance (evaluation of film untreated with heat) was conducted.

Furthermore, after the thermosetting, the coated plate was subjected to a heat treatment at 230° C. for 30 minutes. Subsequently, standing to cool at room temperature was conducted. The resulting coated plate was subjected to the evaluation of soiling resistance (evaluation of film treated with heat) by using the felt pen likewise. The evaluation results thereof are shown in Table 2.

TABLE 2

| | Fluorine based surfactant Compound | Soiling resistance | |
|---|---|---|---|
| | | Film untreated with heat | Film treated with heat |
| Example 18 | A-1 | ⊙ | ⊙ |
| Example 19 | A-2 | ⊙ | ⊙ |
| Example 20 | A-5 | ⊙ | ⊙ |
| Comp. example 6 | none | XX | XX |
| Comp. example 7 | B-1 | Δ | X |
| Comp. example 8 | B-2 | ○ | X |

<Evaluation Criteria of Soiling Resistance>

⊙: The soiling resistance is the best, and the ink is repelled into the shape of beads.

o: The ink is not repelled in the shape of beads, but is repelled in the shape of a line because of weaker repellency.

Δ: The ink is not repelled even in the shape of a line, but is repelled partly because of still weaker repellency.

x: The ink is repelled slightly.

xx: The soiling resistance is the poorest, and the ink is not repelled at all, so that drawing is made on a surface clearly.

The invention claimed is:

1. A fluorine-containing novolac resin represented by General formula (I):

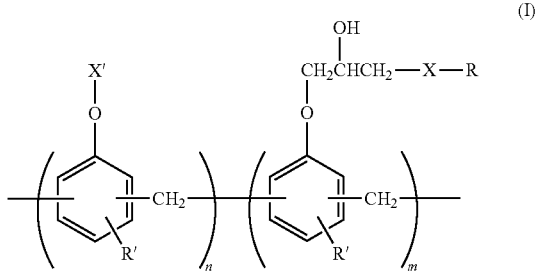

wherein in the formula, R represents a fluorinated-alkyl-containing substituent, R' represents a hydrogen atom or a methyl group, R" represents a hydrogen atom or a non-fluorinated substituent, —X— represents any one of the four following types of linking groups:

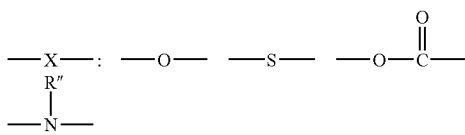

—X' represents any one of three following types of substituents:

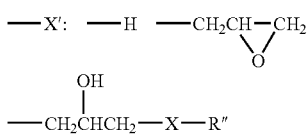

wherein n represents 0 or an integer of 1 or more, m represents an integer of 1 or more, and n+m is an integer of 2 or more, the fluorine-containing novolac resin comprising a (meth) acryloyl group having a structure in which a part of or all hydrogen atoms of the hydroxyl groups shown in the formula (I) representing the fluorine-containing novolac resin are substituted with a structure represented by General formula (II) as follows:

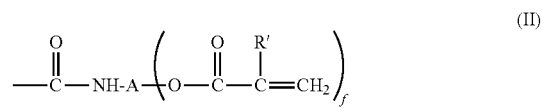

wherein in the formula, R' represents a hydrogen atom or a methyl group, A represents a divalent to quadrivalent linking group which is any one of a hydrocarbon group having the carbon number of 2 to 5, an ethylene oxide chain having the number of ethylene units of 2 to 4, and a propylene oxide chain having the number of propylene units of 2 to 4, and f represents an integer of 1 to 3.

2. The fluorine-containing novolac resin according to claim 1, comprising a structure in which —X' in General formula (1) is other than a hydrogen atom and a part of or all hydrogen atoms of the hydroxyl groups contained in the fluorine-containing novolac resin are substituted with a structure represented by General formula (II).

3. The fluorine-containing novolac resin according to claim 2, wherein the fluorinated-alkyl-containing substituent (R) is a fluorinated-alkyl-containing substituent including only saturated bonds, the linking group (—X—) is a linking group —O— or —S—, and the substituent (—X') is as follows:

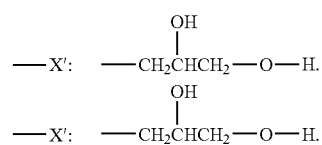

4. A fluorine based surfactant characterized by comprising the fluorine-containing novolac resin according to any one of claims 1 to 3.

5. A fluorine based surfactant composition characterized by comprising the fluorine-containing novolac resin according to any one of claims 1 to 3.

6. The fluorine based surfactant composition according to claim 5, comprising an organic solvent solution of the fluorine-containing novolac resin.

7. A resin composition characterized by comprising the fluorine-containing novolac resin according to any one of claims 1 to 3, an organic solvent, and an ultraviolet-curable resin.

* * * * *